(12) United States Patent
Dean et al.

(10) Patent No.: US 7,012,556 B2
(45) Date of Patent: Mar. 14, 2006

(54) SIGNAL PROCESSING SYSTEM AND METHOD

(75) Inventors: Michael Dean, Malvern (GB); Paul Nicholas Fletcher, Malvern (GB)

(73) Assignee: Qinetiq Limited, (GB)

( * ) Notice: Subject to any disclaimer, the term of this patent is extended or adjusted under 35 U.S.C. 154(b) by 18 days.

(21) Appl. No.: 10/495,839

(22) PCT Filed: Oct. 7, 2002

(86) PCT No.: PCT/GB02/04568

§ 371 (c)(1),
(2), (4) Date: May 17, 2004

(87) PCT Pub. No.: WO03/032522

PCT Pub. Date: Apr. 17, 2003

(65) Prior Publication Data

US 2005/0035894 A1   Feb. 17, 2005

(30) Foreign Application Priority Data

Oct. 8, 2001 (GB) ................................ 0124121
Nov. 2, 2001 (GB) ................................ 0123611

(51) Int. Cl.
   *H03M 1/12* (2006.01)
(52) U.S. Cl. .................... 341/155; 341/152; 341/120
(58) Field of Classification Search ................ 341/155, 341/152, 143, 120, 139, 118, 138
   See application file for complete search history.

(56) References Cited

U.S. PATENT DOCUMENTS

| | | | |
|---|---|---|---|
| 3,964,065 A | 6/1976 | Steffancin et al. | |
| 4,555,706 A | 11/1985 | Haupt | |
| 5,220,583 A | 6/1993 | Solomon | |
| 5,392,044 A * | 2/1995 | Kotzin et al. | 341/155 |
| 5,512,898 A * | 4/1996 | Norsworthy et al. | 341/155 |
| 5,566,209 A | 10/1996 | Forssen et al. | |
| 5,630,227 A | 5/1997 | Hoffmann et al. | |
| 5,861,831 A | 1/1999 | Elliott et al. | |
| 5,914,986 A * | 6/1999 | Ohta et al. | 375/328 |

(Continued)

FOREIGN PATENT DOCUMENTS

DE       3909874       9/1990

(Continued)

OTHER PUBLICATIONS

INSPEC abstract No. 6599197 & Acta Electronica Sinica, Mar. 2000, pp. 9-12, Si De-Yi et al: Frequency and 2D angle estimation of wide frequency band signals with sub-Nyquist sptio-temporal sampling.

(Continued)

*Primary Examiner*—Lam T. Mai
(74) *Attorney, Agent, or Firm*—McDonnell Boehnen Hulbert & Berghoff LLP

(57) ABSTRACT

An adaptive signal processing system (800) comprises a plurality of receiving elements (802a–n), a plurality of analogue to digital converters (ADC's) (806a–n) and a digital signal processor (808). Each of the receiving elements (802a–n) is arranged to receive an incoming signal and has an ADC (806a–n) connected thereto. Each ADC *(806a–n) is arranged to convert a first portion of respective incoming signal into a digital form at a sampling rate less than the temporal Nyquist rate of the incoming signal. The signal processing (808) means is arranged to calculate complex weighting coefficients to be applied to a second portion of the incoming signal using the digitized first portion of the incoming signals. A method of calculating complex weighting coefficients is also described.

25 Claims, 10 Drawing Sheets

U.S. PATENT DOCUMENTS

| | | | | |
|---|---|---|---|---|
| 6,005,506 | A * | 12/1999 | Bazarjani et al. | 341/143 |
| 6,031,879 | A | 2/2000 | Styer et al. | |
| 6,192,256 | B1 | 2/2001 | Whinnett | |
| 6,266,518 | B1 | 7/2001 | Bultman et al. | |
| 6,339,390 | B1 * | 1/2002 | Velazquez et al. | 341/155 |
| 6,388,594 | B1 * | 5/2002 | Velazquez et al. | 341/155 |
| 6,448,921 | B1 * | 9/2002 | Tsui et al. | 342/13 |
| 6,473,013 | B1 * | 10/2002 | Velazquez et al. | 341/155 |
| 6,516,038 | B1 * | 2/2003 | Ohta et al. | 375/328 |
| 6,518,908 | B1 * | 2/2003 | Boehm et al. | 341/155 |
| 6,600,438 | B1 * | 7/2003 | Hilton | 341/155 |
| 6,603,858 | B1 * | 8/2003 | Raicevich et al. | 381/57 |
| 6,628,224 | B1 * | 9/2003 | Mulder et al. | 341/156 |
| 6,727,837 | B1 * | 4/2004 | Ignjatovic et al. | 341/155 |
| 6,787,690 | B1 * | 9/2004 | Celi et al. | 84/723 |

FOREIGN PATENT DOCUMENTS

| | | |
|---|---|---|
| EP | 0 793 360 | 9/1997 |
| EP | 0 806 844 | 11/1997 |
| GB | 2188782 | 10/1987 |
| GB | 2242574 | 10/1991 |
| GB | 2296611 | 7/1996 |
| GB | 2354115 | 3/2001 |
| JP | 09-307335 | 11/1996 |
| JP | 8298631 | 11/1996 |
| JP | 10-224138 | 7/1998 |
| WO | WO 96/21305 | 7/1996 |

OTHER PUBLICATIONS

INSPEC abstract No. 6482894 & IEEE Antennas and Propagation Society International Symposium, 1999 digest vol. 2, pp. 1100-1103: Ellington SW et al.: Low-cost adaptive arrays for analysis of wireless systems, no month.

INSPEC abstract No. 5815036 & Radioengineering (Czech Republic), Dec. 1997, Czech Tech. Univ. for Radioeng. Dept. Czech Republic, Czech Republic, vol. 6, No. 4, pp. 6-9, Pomenka P & Raida Z: A simple digital adaptive antenna based on undersampling.

INSPEC abstract No. 5446201 & Bulletin of the Polish Academy of Sciences, Technical Sciences, 1996, vol. 44. No. 2 pp. 157-168: Misiurewicz J: An algorithm for frequency estimation beyond the Nyquist range in MTI radar Doppler signal processing, no month.

INSPEC abstract No. 4903269 & IEEE Antennas and Propagation Society International Symposium. 1993-International Symposium Digest Antennas and Propagation (Cat. No. 93DCH3289-6), vol 2 pp. 686-689: Pasala K M; Penno R P: Accurate determination of frequency and angle of arrival from undersampled signals, no month.

INSPEC abstract No. 4798812 & IEEE Trans. On Signal Processing, Oct. 1994, vol. 42 no 10 pp. 2781-2794; Zolotowski MD & Mathews CP: Real-time frequency and 2-D angle estimation with sub-Nyquist spatio-temporal sampling.

INSPEC abstract No. 2947173 & Proc SPIE, 1987, vol 696 pp. 115-122: Steinberg BD: The role of digital adaptive beamforming in high resolution microwave imaging, no month.

INSPEC abstract No. 1730608 & 2nd Int. Conf. on Antennas & Propagation, 1981, IEE, part 1 pp. 491-494 : Ojeba EB : The effect of undersampling and finite truncation of the antenna nearfield data on the predicted far-field pattern, no month.

INSPEC abstract No. 1709125 & 1981 IEEE Int. Symp. On Information Theory, 1981 p. 64: Wu WW: Applications of combined sets in satellite communications, no month.

Search Report from the UK Patent Office for application No. GB 0124121.5, no month no year.

* cited by examiner

SIGNAL PROCESSING SYSTEM AND METHOD

This application is a continuation of a 371 of PCT/GB 02/04568.

This invention relates to a signal processing system and method. More particularly, but not exclusively, the invention relates to a system and method for adaptive signal processing for beamforming and signal detecting.

Phased array antennas where energy impinges upon an array aperture of a plurality of radiating/receiving elements are well known. In a phased antenna an incoming wavefront is subject to weighting by a complex function at each individual radiating element. The purpose of the weighting is to compensate for the phase shift experienced by the wavefront in traversing the distance between radiating elements in order that the contributions from the wavefront can be summed by a beamformer. It is these weightings that effectively steer phased array antennas, as changing the weightings for antennas elements changes the direction to which the antenna is tuned.

The weighting procedure can be used to spatially filter incoming signals of the same frequency by spatially rejecting interfering signals. This spatial rejection of signals, or nulling, is achieved by weighting a signal from the interfering direction such that the weighted components of the signal are in antiphase and when summed given a zero, null, amplitude. Nulling has the attendant difficulty that the location of each user must be known in order to calculate the correct weightings in order to be able to place the interfering signals components in antiphase, i.e. it requires a priori knowledge of the system that will not always be available. Therefore adaptive phased array antennas sample in the temporal domain in order to overcome this problem.

In a true adaptive (smart) antenna a computation is carried out in order to ascertain the weightings that must be applied in order to fulfil a given criteria, for example a given steering direction.

In a prior art analogue smart antenna as typically used in telecommunication applications, as shown in FIG. 3, respective portions of a signal received by respecting radiating elements are passed to an adaptive processor along with an error signal. The error signal is the difference between an output from a beamformer, the output containing a wanted signal and unwanted signals from interferers, and a desired, training, signal. The adaptive processor performs a least mean squared analysis in order to minimise this error by varying the weightings. This smart antenna arrangement has the problem that the desired signal may only be known for a short period of time and the signal changes as the radiator moves (and possibly as changes in the environment through which the wave is propagated occur—e.g. changing reflection). This necessitates the frequent use of training sequences where a known signal is radiated and any error between the received signal and a reference must be corrected. The correction conversion is applied to the next signal and subsequent signals which are expected to have reasonable signal coherence. For example, in GSM training sequences are emitted that account for 23% of the data stream.

Prior art adaptive antennas which are used in radar systems, as shown in FIG. 4, employ a similar technique whereby signals received by each radiating element are sampled by an adaptive processor which is supplied with a steering vector. The steering vector comprises the magnitude and phaseshifts required to steer a beam in a given direction (or to steer the sensitivity response pattern of the antenna in a given direction).

The adaptive algorithm executed by the adaptive processor typically minimises the power at the beamformer output in order to null the contributions from interferers.

The use of a known steering vector is possible as the radar is scanning and therefore the direction of radiation/arrival is known. The beamformer must be able to process the incoming signals at the temporal Nyquist rate, typically 10's of MHz (i.e. the rate of change of temporal information within the sample). This is why the majority of beamformers are analogue as there is no Nyquist sampling constraint in analogue signal processing. However, any digital processor used must also be able to calculate weighting coefficients within the coherence time of the channel.

The Nyquist sampling requirement applies to all-digital systems where the incoming signal is digitised prior to beamforming and in which both the beamforming and calculation of the new weighting coefficents are carried out by a digital processor.

There are also hybrid digital-analogue systems where the beamforming is carried out by an analogue beamformer controlled by digital controllers that are supplied with weighting coefficients calculated by a digital processor. The Nyquist sampling requirement applies to the sampling of the analogue signal prior to its digitisation for calculating the weighting coefficients.

In a fully digitised scheme that samples in the temporal domain, as shown in FIG. 5, the signals from the radiating elements are digitised by analogue to digital converters and passed to an adaptive processor that calculates the weightings and passes them to a microprocessor where the weighting procedure is carried out. This arrangement has the attendant problem that due to the high bandwidths involved, for example radar signals have a typical bandwidth of >10 MHz, a very high sampling rate (10's of MHz, for example about 20 MHz) must be employed to fulfil the temporal Nyquist requirement and prevent aliasing. High sampling speeds require very fast and therefore very expensive ADC's.

In a prior art purely analogue antenna scheme, as shown in FIG. 6, the incoming signal from each radiating element is mixed with a lower frequency, phase controlled signal from a respective phase controlled local oscillator typically using a vector modulator. This imposes the phase of the local oscillator on the incoming signals at the beamformer. The problem in turning this arrangement into an adaptive antenna scheme is the necessity to sample the incoming sample at the required frequencies. This is a significant technical challenge in the analogue regime.

It is an aim of at least one embodiment of the present invention to provide an adaptive signal processing system that, at least partially, ameliorates at least one of the above-mentioned problems and/or disadvantages, or that is an improvement over the prior art.

It is a further aim of at least one embodiment of the present invention to provide a method of signal processing that, at least partially, ameliorates at least one of the above-mentioned problems and/or disadvantages, or that is an improvement over the prior art.

According to a first aspect of the present invention there is provided an adaptive signal processing system comprising a plurality of receiving elements, a plurality of analogue to digital converters (ADC's) and digital signal processing means; each of the receiving elements having a respective one of the ADC's connected thereto and being arranged to receive a respective incoming signal, wherein each ADC is arranged to convert a first portion of the respective incoming signals into a digital form at a sampling rate that is less than the temporal Nyquist rate of the incoming signal, and the signal processing means is arranged to calculate complex weighting coefficients to be applied to respective second portions of the respective incoming signals.

It has been appreciated, now, that it is possible to sample a signal using sub-Nyquist sampling rates in a temporal domain whilst fulfilling the Nyquist sampling criteria in the spatial domain. That is to say, the realisation that weighting coefficients are weighted to compensate for spatial domain factors and that things alter in the spatial domain a lot more slowly than in the temporal domain, and that this means that it is possible to have a sampling rate of a signal (for use in calculating weighting functions), that is less, often very much less, than the Nyquist sampling rate of a received signal that applies to its temporal information contact.

This means that it is possible to use lower power processors to calculate the weighting coefficients (or take up less capacity of any given processor), and that the ADC converters need not have so fast a sample-and-hold acquisition time.

Preferably the processor is arranged to utilise the digitised first portion of the incoming signal in the calculation of the complex weighting coefficients The system may include a second plurality of ADC's that are arranged to sample the second portion of the respective incoming signals at at least the temporal Nyquist sampling rate. The first plurality of ADC's may be arranged to sample the incoming signals prior to them reaching the second plurality of ADC's.

The processing means may be arranged to apply the complex weighting coefficients to the second portion of the incoming signals. Alternatively, or additionally there may be a second digital processing means arranged to apply the complex weighting coefficients to the second portion of the incoming signals. The first and second digital processing means may be distinct parts of a digital signal processing (DSP). Alternatively, the first and second digital processing means may be signal processing routines executed on a single DSP.

Each of the first plurality of ADC's may have a sample and hold unit circuit typically with an acquisition time of 0.1 ns or less, or of the order of 0.1 ns or less.

The system may include at least one plurality of phase changing means, each phase changing means being associated with a respective receiving element, each of which may be connected to a digital control unit. Each of the digital control units may be arranged to receive respective outputs from the processing means that are indicative of the complex weighting coefficients. Each control unit may be arranged to supply a digital or analogue signal to a respective phase changing means such that the second portion of the respective fraction of the incoming signal has its phase and/or amplitude varied by an amount corresponding to the complex weighting coefficient. The phase changing means may comprise analogue components adapted to change the phase of a signal, the phase changing means being either under analogue control or digital control.

The ADC's may be arranged to sample respective signals after they have been passed through the phase changing means. The processing means may be arranged to remove the phase and/or amplitude variations imposed upon the first portions of the respective signals by the phase changing means. The second portions of respective signals may be the whole of the respective signals.

The phase changing means may include phase controlled local oscillator and/or and may include a vector modulator, for example a diode.

The signal may have a frequency of the order of, or between any pair of, the following when sampled by the first plurality of ADC's: <20 MHz, 20 MHz, 50 MHz, 125 MHz, 135 MHz, 145 MHz, 150 MHz, 500 MHz, 750 MHz, 1 GHz, 1.25 GHz, >1.25 GHz.

The first plurality of ADC's may be arranged to sample the incoming signal at a rate of the order of, or between any two of, the following: <20 kHz, 20 kHz, 40 kHz, 50 kHz, 60 kHz, 80 kHz, 100 kHz, >100 kHz.

According to a second aspect of the present invention there is provided a digital adaptive signal processing system comprising a plurality of receiving elements, first and second digital signal processing means, first and second pluralities of analogue to digital converters (ADC's); each of the receiving elements being arranged to receive an incoming signal, the first plurality of ADC's being arranged to sample respective first portions of the respective signals at a first sampling rate and the second plurality of ADC's being arranged to sample a second portion of the respective signals at a second sampling rate, the second sampling rate being higher than the first sampling rate, wherein the first digital signal processing means is arranged to calculate complex weighting coefficients for each of the respective signals using the outputs from the first plurality of ADC's and the second digital signal processing means is arranged to apply said weightings to said second portions of said signals.

The first plurality of ADC's may be arranged to sample the first portion of the respective incoming signal at a rate below the temporal Nyquist rate, but at or above the spatial Nyquist sampling rate, of the incoming signal. The second plurality of ADC's may be arranged to sample the second portion of the respective incoming signal at or above the temporal Nyquist sampling rate of the incoming signal.

The first plurality of ADC's may be arranged to sample the incoming signal prior to it reaching the second plurality of ADC's.

The first and second signal processing means may be different digital signal processors (DSP's). Alternatively, the first and second signal processing means may be distinct parts of a DSP. Alternatively, the first and second signal processing means may be signal processing routines executed on a single DSP. The first signal processing means may be arranged to communicate the complex weighting coefficients to the second signal processing means and the second signal processing means may be arranged to apply each complex weighting coefficient to a respect first portion of respective incoming signals.

The system may include at least one plurality of frequency down-converting means each of which is associated with respective receiving elements and respective first ADC's may be arranged to sample the first portion of each respective signal after it has passed through respective down-converting means.

The down converting means may be a frequency mixer.

The incoming signals may have a frequency of the order of, or between any pair of, the following once it has passed through the frequency down conversion means: <20 MHz, 20 MHz, 50 MHz, 125 MHz, 135 MHz, 45 MHz, 150 MHz, 500 MHz, 750 MHz, 1 GHz, 1.25 GHz, >1.25 GHz.

The first plurality of ADC's may have a sample and hold circuit, typically with an acquisition time of the order of 0.1 ns or less.

The first plurality of ADC's may be arranged to sample the incoming signal at a rate of the order of, or between any two of the following: <20 kHz, 20 kHz, 40 kHz, 50 kHz, 60 kHz, 80 kHz, 100 kHz, >100 kHz.

According to a third aspect of the present invention there is provided a digitally controlled analogue adaptive signal processing system comprising a plurality of receiving elements, at least one plurality of phase changing means, a plurality of analogue to digital converters (ADC's), a digital signal processing means, and an analogue signal processing means; and in which each of the receiving elements is arranged to receive an incoming signal, each of the receiving elements is arranged to feed a respective phase changing means, each ADC is arranged to sample the output from a respective phase changing means, the digital signal processing means is arranged to calculate respective complex weighting coefficients to be applied to respective incoming signals and to control the phase changing means so as to apply, in use, the respective weighting coefficients to the respective incoming signals received by respective receiving elements.

Preferably the processor is arranged to utilise the digitised sample of the incoming signal in the calculation of the complex weighting coefficients.

The system may include at least one plurality of phase changing means, each phase changing means being associated with a respective receiving element. The system may include at least one plurality of frequency down-shifting means, each down-shifting means being associated with a respective receiving element. At least one of each of the down shifting means and phase changing means may be the same device.

Each of the phase changing means may be connected to a respective digital control unit. Each of the digital control units may be arranged to receive respective outputs from the processing means that are indicative of the complex weighting coefficients. Each control unit may be arranged to supply an analogue or digital signal to its respective phase changing means such that the second portion of each fraction of the incoming signal has its phase and/or amplitude varied by an amount corresponding to the complex weighting coefficient. The phase changing means are preferably adapted to operate in an analogue manner on the signals it receives from their respective antennae elements.

The signal may have a frequency of the order of, or between any pair, of the following when sampled by the ADC's: <20 MHz, 20 MHz, 50 MHz, 125 MHz, 135 MHz, 145 MHz, 150 MHz, 500 MHz, 750 MHz, 1 GHz, 1.25 GHz, >1.25 GHz.

The ADC's may have a sample and hold circuit, typically with an acquisition time of 0.1 ns or less.

The ADC's may be arranged to sample the incoming signal at a rate of the order of or between any two of the following: <20 kHz, 20 kHz, 40 kHz, 50 kHz, 60 kHz, 80 kHz, 100 kHz, >100 kHz.

According to a fourth aspect of the present invention there is provided an adaptive signal processing system comprising a plurality of analogue to digital converters (ADC's) and digital signal processing means; each of the ADC's being arranged to receive a respective incoming signal from a receiving element, wherein each ADC is arranged to convert a first portion of the incoming signal into a digital form at a sampling rate less than the temporal Nyquist rate of the incoming signal, and the signal processing means is arranged to calculate respective complex weighting coefficients to be applied to a second portion of the incoming signals.

Preferably the processor is arranged to utilise the digitised first portion of the incoming signal in the calculation of the complex weighting coefficients.

According to a fifth aspect of the present invention there is provided a method of signal processing comprising the steps of:
i) receiving an analogue signal at a plurality of receiving elements;
ii) sampling the signal at a sampling rate below the temporal Nyquist rate of the signal;
iii) converting said samples into a digital form; and
iv) calculating an individual adaptive complex weighting coefficient for the signals received at each of the plurality of receiving elements digitally.

The method may include utilising the digitised samples in the calculation of the complex weighting functions. The method may include applying each weighting coefficient to its respective signal.

The method may include sampling each signal at a sampling rate above the spatial Nyquist sampling rate of the signal. The method may include sampling the signal at a rate of the order of, or between any two of, the following: <20 kHz, 20 kHz, 40 kHz, 50 kHz, 60 kHz, 80 kHz, 100 kHz, >100 kHz. The method may include down-shifting the frequency of the signals, typically employing a down-shifting mixer, prior to sampling the signals. The method may include down-shifting the frequency of the signals to the order of, or between any pair of, the following: <20 MHz, 20 MHz, 50 MHz, 125 MHz, 135 MHz, 145 MHz, 150 MHz, 500 MHz, 1 GHz, 1.25 GHz, >1.25 GHz.

The method may include sampling the signals either before or after previously calculated complex weighting coefficients have been applied thereto. In the case where previous complex weighting coefficients have been applied to the signals the method may include removing the respective previously applied coefficients from the samples prior to calculating the individual complex weighting coefficients.

The method may include applying each complex weighting coefficient to its respective signal in a digital processing means. Alternatively the method may include applying each complex weighting coefficient to its respective signal by a digitally controlled analogue phase changing means. The method may include downshifting the frequency of and applying the complex weighting coefficient to each respective signal by means of a single device.

According to a sixth aspect of the present invention there is provided a method of producing weighting coefficients for adaptive beamforming comprising undersampling analogue signals from antenna elements in comparison with a temporal Nyquist rate; converting the undersampled analogue signals to digital signals in order to produce the weighting coefficients.

Preferably the method include applying the weighting coefficients to signals from the antennae elements.

Preferably the method includes receiving signals containing temporal information at a control processor at a first frequency and receiving signals relating to the weighting coefficients at the control processor at a second frequency, the first frequency being significantly higher that the second frequency. More preferably the first frequency is at least about an order of magnitude higher than the second frequency, or at least about two orders of magnitude higher, or at least about three orders of magnitude higher.

Preferably the method include applying the weighting coefficients to signals containing temporal information in an analogue manner. Preferably the method includes undersampling analogue signals and converting them to digital signals in order to produce the weighting coefficients. The method may include generating the weighting coefficients using digitally undersampled signals to control analogue combination means to combine temporal signals with weighting coefficients According to a seventh aspect the invention comprises a signal sampler adapted to sample the signals from an array of antenna elements; a weighting generator adapted to generate from the signals from the signal sampler a weighting to be applied to signals received from an array of antenna elements; and a signal combiner adapted to combine the signals received from antenna elements with respective weightings from the weighting generator to produce modified antenna output signals; and a beamformer adapted to sample the modified antenna output signals at a beamformer rate and create a detected beam from there, and in which the signal sampler is adapted to sample signals received at the antenna elements at a rate that is significantly slower than the beamformer rate.

Preferably the signal sampler rate is at least in order of magnitude less than the beamformer sampling rate. Preferably the beamformer has a plurality of sample and hold devices which have a speed that is significantly faster than sample and hold devices of the signal sampler, preferably at least an order of magnitude faster.

According to an eighth aspect of the present invention, there is provided an adaptive signal processing system comprising a plurality of receiving elements, beamforming means, a plurality of analogue to digital converters (ADCs), digital processing means, and in which the signal weighting means have a plurality of input channels and a respective plurality of output channels, the signal processing means including a memory unit arranged to temporarily store a plurality of previously calculated complex weighting coefficients, each of the receiving elements being arranged to receive an incoming signal and being connected to a respective input channel, each of the ADCs being arranged to sample an analogue signal directly from an output channel, and convert it into digital signals wherein the processing means is arranged to calculate new complex weighting coefficients using the digitised signals and the previously calculated coefficients.

This system has the advantage, over the prior art beamforming arrangements discussed, that by sampling the incoming signals after the beamformer the frequency of the sampled signals is greatly reduced compared to the incoming signals, thus allowing lower speed, cheaper, ADCs to be used. It also allows a slower, cheaper, and/or uses less of a processor's processing power, to be used in calculating the new weighting coefficients as the beamformer reduces the frequency of the incoming signals prior to sampling. Therefore, the temporal Nyquist criteria can be fulfilled at a lower sampling and processing rate.

The memory unit may be arranged to temporarily store the new complex weighting coefficients, typically by overwriting the previously calculated complex weighting coefficients. The processing means may be arranged to transfer the new coefficients to the signal weighting means and the signal weighting means may be arranged to apply the new coefficients to an incoming signal.

The signal weighting means may include a plurality of digital control units and/or respective analogue phase modulators. The digital control units may be arranged to receive respective new weighting coefficients from the processing means and may be arranged to control respective phase modulators so as to beamform the incoming signals, in response to the new weighting coefficients, in use.

Each output channel may be arranged to be sampled by a coupling circuit or by tapping a portion of the signal from the output channel.

The signal weighting means may be arranged to receive incoming signals at the order of any one of the following frequencies: 10 GHz, 1 GHz, 500 HMz. The signal weighting means may be arranged to output signals at the order of any one of the following frequencies: 100 MHz, 50 MHz, 10 MHz.

The signal weighting means may be arranged to downshift the frequency of the incoming signals, typically from the order of 1 GHz to the order of 50 MHz.

The ADC's may be arranged to sample the signal after the signal weighting means and before a summation means.

The ADC's may be arranged to sample the signal at a rate between any pair of the following: <10 kHz, 10 kHz, 25 kHz, 30 kHz, 40 kHz, 50 kHz, 75 kHz, 100 kHz, >100 kHz.

According to a ninth aspect of the present invention, there is provided a method of adaptive signal processing comprising the steps of:
  (i) receiving an analogue signal;
  (ii) downshifting the frequency of the signal;
  (iii) beamforming the signal;
  (iv) sampling the signal after beamforming;
  (v) converting the signal sample into a digital signal; and
  (vi) calculating a new complex weighting coefficient using the digitised signal; using the digital signal and the previously calculated complex weighting coefficients digitally.

The method may include controlling step (ii) using the previously calculated complex weighting coefficient.

The method may include receiving a plurality of signals and executing steps (ii) to (v) for each respective signal, typically in parallel.

The method may include providing a beamformer in the form of an analogue phase modulator which may be arranged to be controlled by a digital control unit. The method may include providing a plurality of phase modulators and digital control units.

The method may include accessing the previously calculated complex weighting coefficient from a memory unit in order to perform step (v). Preferably, the method includes any one, or combination of: subtracting, multiplying, adding, dividing, or non-linearly operating: from, with, to, by the previously calculated coefficient upon the digitised sample in order to perform step (v). The method may include storing the new complex weighting coefficient in the memory unit, preferably overwriting the previously calculated coefficient with the new coefficients. The method may include providing processing means to calculate the new complex weighting coefficient.

The method may include passing a digital signal containing information indicative of the new coefficient to the digital control unit. The method may include generating an analogue output from the digital control unit so as to control the phase modulator to execute step (ii).

The method may include processing the analogue signal prior to beamforming. The processing may typically include any one, or combination, of the following: downshifting frequency mixing, attenuation and/or phase modulation.

The method may include executing step (iii) of the method at between any pair of the following values: <10 kHz, 10 kHz, 25 kHz, 30 kHz, 40 kHz, 50 kHz, 75 kHz, 100 kHz, >100 kHz.

The method may include executing step (iii) after step (ii) yet before summing a plurality of beamformed signals.

The method may include downshifting the frequency of the signal during step (ii), typically from the order of 1 GHz to the order of 50 MHz. The method may include providing ADCs to perform step (iv).

According to a tenth aspect of the present invention there is provided a program storage device readable by a machine and encoding a program of instructions which when operated upon the machine cause it to operate as the system according to any one of the first, second third, fourth, or eighth aspects of the present invention.

According to a eleventh aspect of the present invention there is provided a computer readable medium having stored therein instructions for causing a device to execute the method of the fifth, sixth or ninth aspects of the present invention.

According to a twelfth aspect of the present invention there is provided a telecommunications system incorporating an adaptive signal processing system according to any one of the first, second, third, fourth, or eighth aspects of the present invention and/or being arranged to execute the method of either of the fifth, sixth or ninth aspects of the present invention.

According to an thirteenth aspect of the present invention there is provided a method of increasing the number of users accommodated within a telecommunications channel of a given bandwidth by spatially filtering signals arriving at a receiver using selectively an adaptive signal processing system according to any one of the first, second, third, fourth or eighth aspects of the present invention, and/or executing the method of either of the fifth, sixth or ninth aspects of the present invention.

According to another aspect of the present invention there is provided an adaptive signal processing system comprising a plurality of receiving elements, a plurality of analogue to digital converters (ADC's) and digital signal processing means; each of the receiving elements having a respective one of the ADC's connected thereto and being arranged to receive a respective incoming signal, wherein each ADC is arranged to convert a first portion of the respective incoming signals into a digital form at a sampling rate that is less than the temporal Nyquist rate of the incoming signal, and the signal processing means is arranged to calculate complex weighting coefficients to be applied to respective second portions of the respective incoming signals.

According to yet another aspect of the present invention there is provided a method of producing weighting coefficients for adaptive beamforming comprising undersampling signals from antennae elements in comparison with a temporal Nyquist rate; and using the undersampled signals to produce weighting coefficients for each antenna element.

According to a further aspect of the present invention, there is provided an adaptive signal processing system comprising a plurality of receiving elements, beamforming means, a plurality of analogue to digital converters (ADCs), digital processing means, and in which the signal weighting means have a plurality of input channels and a respective plurality of output channels, the signal processing means including a memory unit arranged to temporarily store a plurality of previously calculated complex weighting coefficients, each of the receiving elements being arranged to receive an incoming signal and being connected to a respective input channel, each of the ADCs being arranged to sample an analogue signal from an output channel, and convert it into digital signals wherein the processing means is arranged to calculate new complex weighting coefficients using the digitised signals and the previously calculated coefficients.

According to a yet further aspect of the present invention, there is provided a method of adaptive signal processing comprising the steps of:
(i) receiving an analogue signal;
(ii) beamforming the signal;
(iii) sampling the signal after beamforming;
(iv) converting the signal sample into a digital signal; and
(v) calculating a new complex weighting coefficient using the digitised signal; using the digital signal and the previously calculated complex weighting coefficients digitally.

The invention will now be described by way of example only, with reference to the accompanying drawings, in which.

Figure 1:
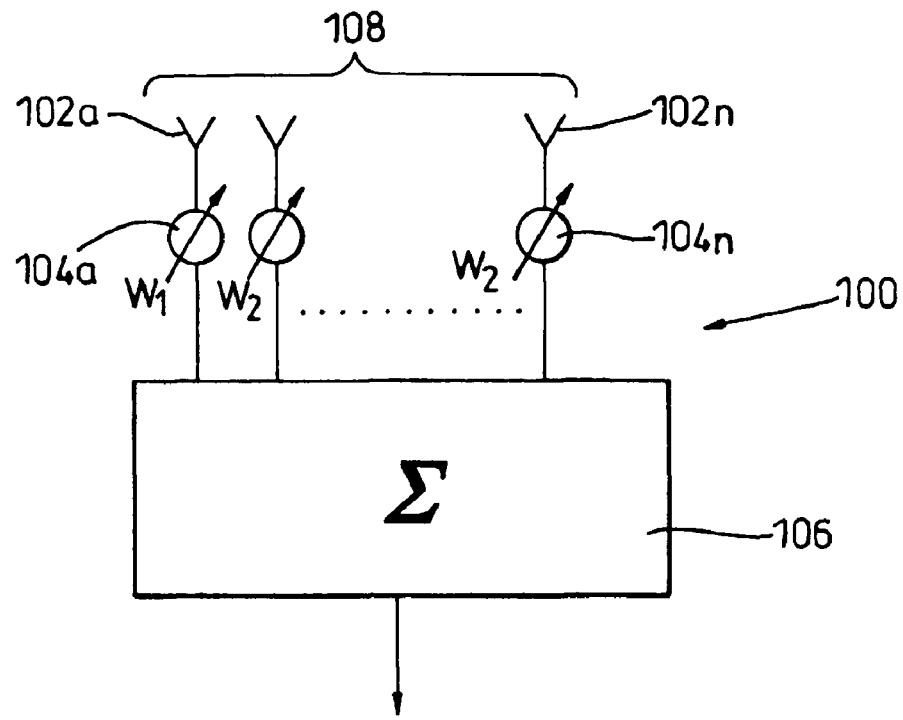
FIG. 1 is a schematic representation of a prior art phased array antenna device with beam former.

Referring now to FIG. 1, a phased array device 100 comprises a plurality of receiving elements 102a–102n each having a respective one of weighting units 104a–104n associated therewith and a beamformer 106. The receiving elements define an array aperture 108, a fraction of radiation impinging upon the array aperture 108 is detected by each of the receiving elements 102a–102n. This situation is shown in detail in FIG. 2, in which parts similar to those of FIG. 1 are accorded similar reference numerals in the two hundred series.

Figure 2:
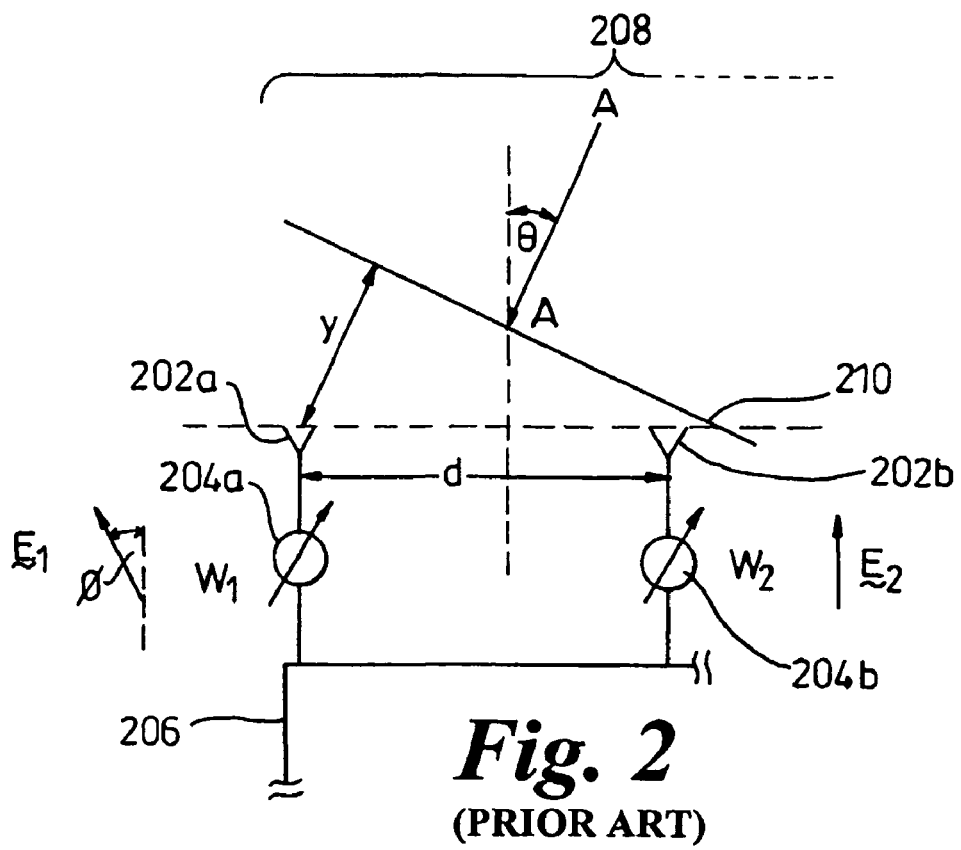
FIG. 2 is a representation of a wavefront impinging upon two elements in an array aperture of the device of FIG. 1.

Referring now to FIG. 2, a wavefront 210 is incident upon the array aperture 208, at an angle θ to the normal of the aperture 208, along a vector A—A. Considering two adjacent receiving elements 202a,b the wavefront 210 must travel an additional distance y after being received by the element 202b before being received by the element 202a. From simple geometric consideration it can be seen that y=d sin θ. This extra distance of travel introduces a phaseshift between the wavefront received at the two elements 20a,b of $$\emptyset = \left(\frac{2\pi}{\lambda}\right) d\sin\theta.$$

The weighting units 208a,b apply a correction in order that the electric vectors of the respective fractions of the wavefront detected at the receiving elements 202a,b are aligned prior to passing to the beamformer 206 to be summed. Thus, it can be seen that by altering the phase correction applied to the detected fractions of the wavefront 210 the antenna array can be spatially scanned as each direction will exhibit a unique phase relationship between the receiving elements 202a–n.

Also it can be seen that directions can be spatially filtered by weighting the phase corrections to the receiving elements such that the sum of the fractions of the E vector of a wavefront from the desired directions detected by the receiving elements is zero. This is achieved by weighting the phase corrections such that the fractions of the E vector detected are in antiphase to each other and therefore sum to zero.

Whilst nulling increases the number of radiators that can be accommodated within a channel, by spatially selecting those radiators to which the channel is open (or deselecting radiators not to be considered), only a limited number of directions can be excluded from any given channel. The number of directions that can be excluded from a channel is determined by the number of degrees of freedom of the sensor array, for a sensor array having n elements there are n−1 degrees of freedom that can be nulled.

Figure 3:
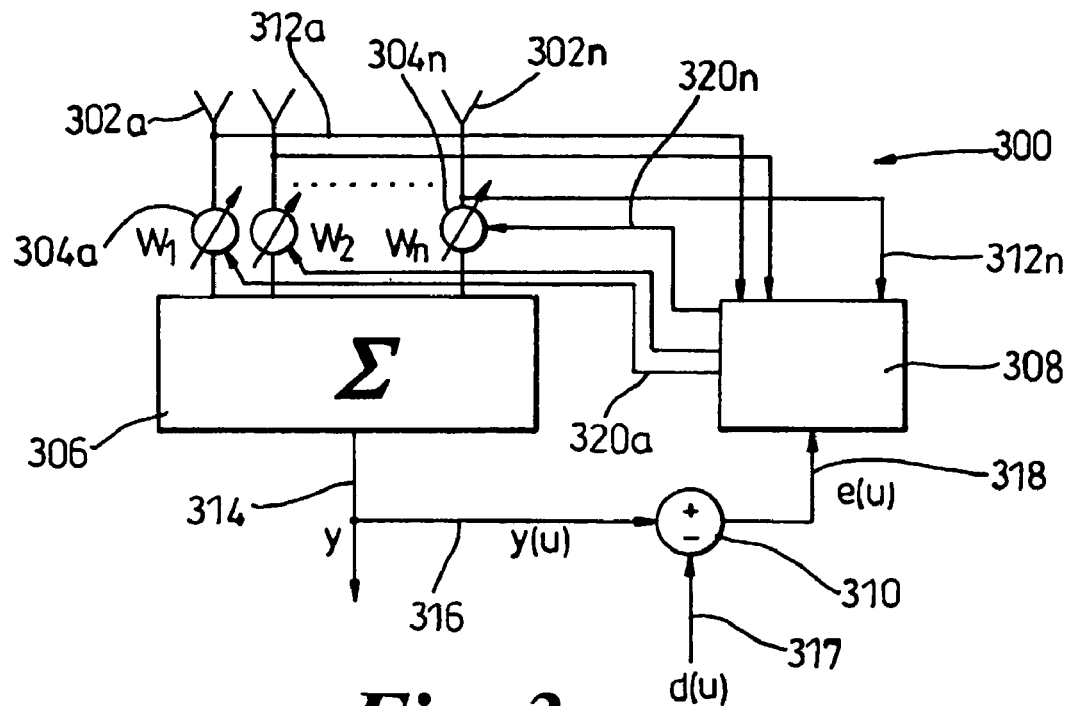
FIG. 3 is a schematic representation of a prior art analogue smart phased array antenna.

Referring now to FIG. 3, this shows a smart antenna arrangement 300 as used in telecommunications applications. The antenna arrangement comprises a plurality of receiving elements 302a–n each with an associated weighting units 304a–n, a beamsformer 306, an adaptive processing unit 308 and a difference unit 310.

Instead of/in addition to nulling, other adaptive beamforming techniques can be applied to minimise problems from sidelobes.

The receiving elements 302a–n, weighting unit 304a–n and beamsformer 306 operate substantially in the fashion described hereinbefore. However, a portion of the signal 312a–n received by each of receiving elements is tapped off, or coupled to a sampling arrangement, see for example FIG. 3a, prior to the signal passing through the weighting units 304a–n, and is passed to the adaptive processing unit 308.

The beamformer 306 outputs a signal 314, which has a sample 316 tapped off and passed to the difference unit 310, where it is compared to a training signal 317. The training signal 317 is an estimate, of if the desired output is known it is, the output signal desired from the beamformer 306. An error signal 318 is generated by the difference unit 310 based upon the difference between the sample 316 and the training signal 317 which is passed to the adaptive processing unit 308.

The adaptive processing unit 308 attempts to minimise the difference between the sample 316 and the training signal 317 by carrying out a least squares minimisation analysis varying weights 320a–n sent to each of the weighting units 304a–n in order to achieve this.

This arrangement has the problem that the desired (training) signal 317 may only be known for a short time due to the low temporal coherence time of non-static radiators.

Figure 3A:
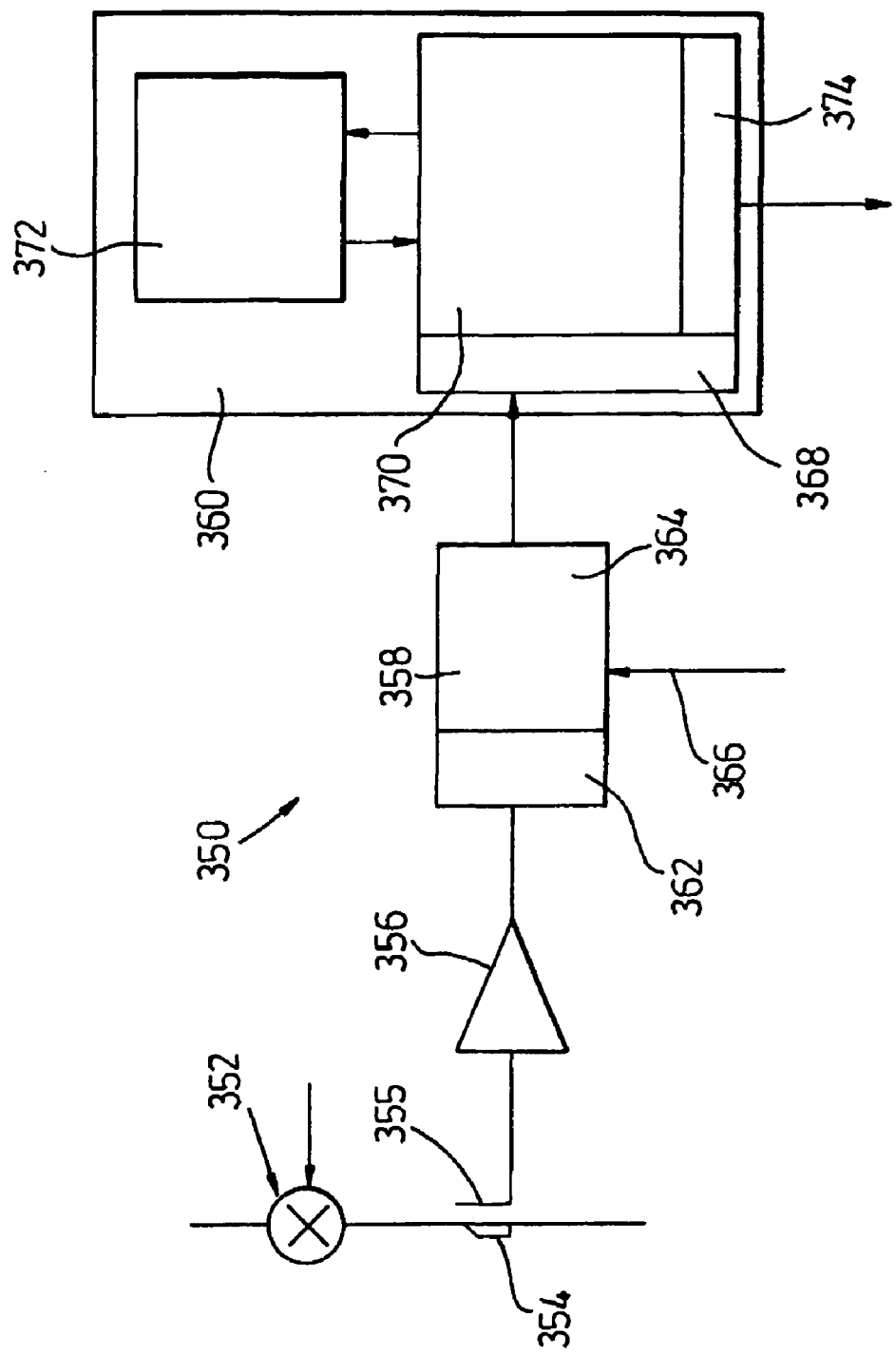
FIG. 3a is a schematic representation of a signal coupling arrangement.

Referring now to FIG. 3a, a signal coupling arrangement 350 comprises a local oscillator (LO) 352, a coupling region 354, a signal pick up 355, an amplifier 356, an ADC 358 and an adaptive processor 360. The ADC 358 includes a sample-and-hold circuit 362, an ADC unit 364 and a clock input 366. The adaptive processor 360 includes an input 368, a signal processor 370, a memory unit 372 and an output 374.

A signal passes from the LO 352 to the coupling region 354 where the pick up 355 is, typically, inductively coupled to the coupling region 354. The coupled signal is then amplified by the amplifier 356 and passes to the ADC 358. The digitised signal is then passed to the input 368 of the adaptive processor 360 and is processed by the signal processor 370 in order to calculate a complex weighting coefficient for the signal.

The memory unit 372 allows previously calculated weighting coefficients to be stored in order that they can be removed from the coupled signal prior to the calculation of new weighting coefficients should the coupling region 354 be situated after a beamformer (not shown).

The calculated adaptive complex weighting coefficients are passed via the output 374 to a beamformer.

Figure 4:
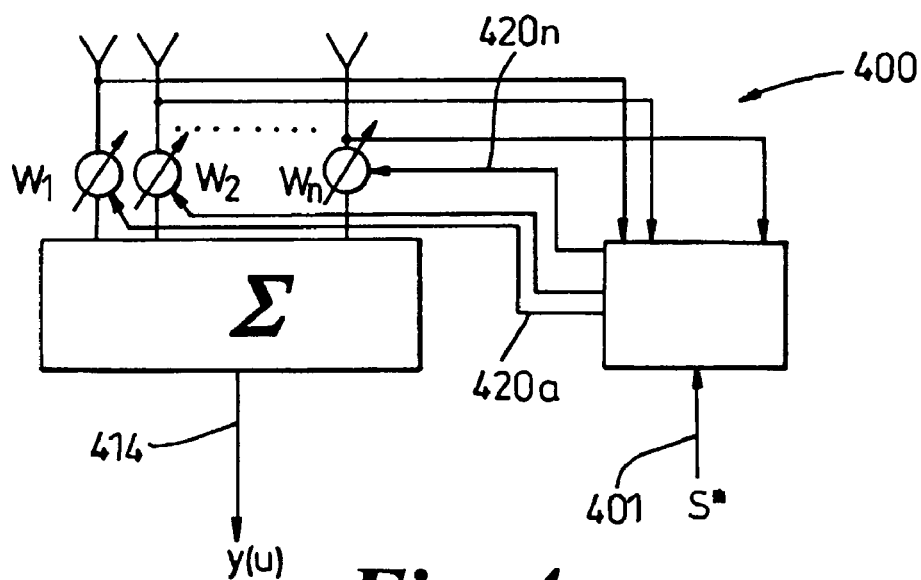
FIG. 4 is a schematic representation of a prior art analogue beam steering adaptive phased array antenna.

Referring now to FIG. 4, this shows an adaptive beam steering arrangement 400 which is substantially similar to the smart antenna arrangement of FIG. 3 except that a steering vector 401 is directly applied to an adaptive processing unit 408 as the weights 420a–n required to sight in a given direction are known and will typically be stored in the processing unit 408. The beamformer output 414 is processed subject to a power minimisation constraint in order to reduce, in far as is practicable, the effects of interfering radiators (also subject to the constraint of the steering vector).

In all of the aforementioned arrangements the Nyquist sampling criteria for the production of the weighting coefficients is not an issue as they all employ analogue adaptive techniques. However, there is the problem associated with all analogue techniques that the signals are more likely to become corrupt than a digital signal and the signal processing techniques are not as robust as digital processing techniques.

Figure 4A:
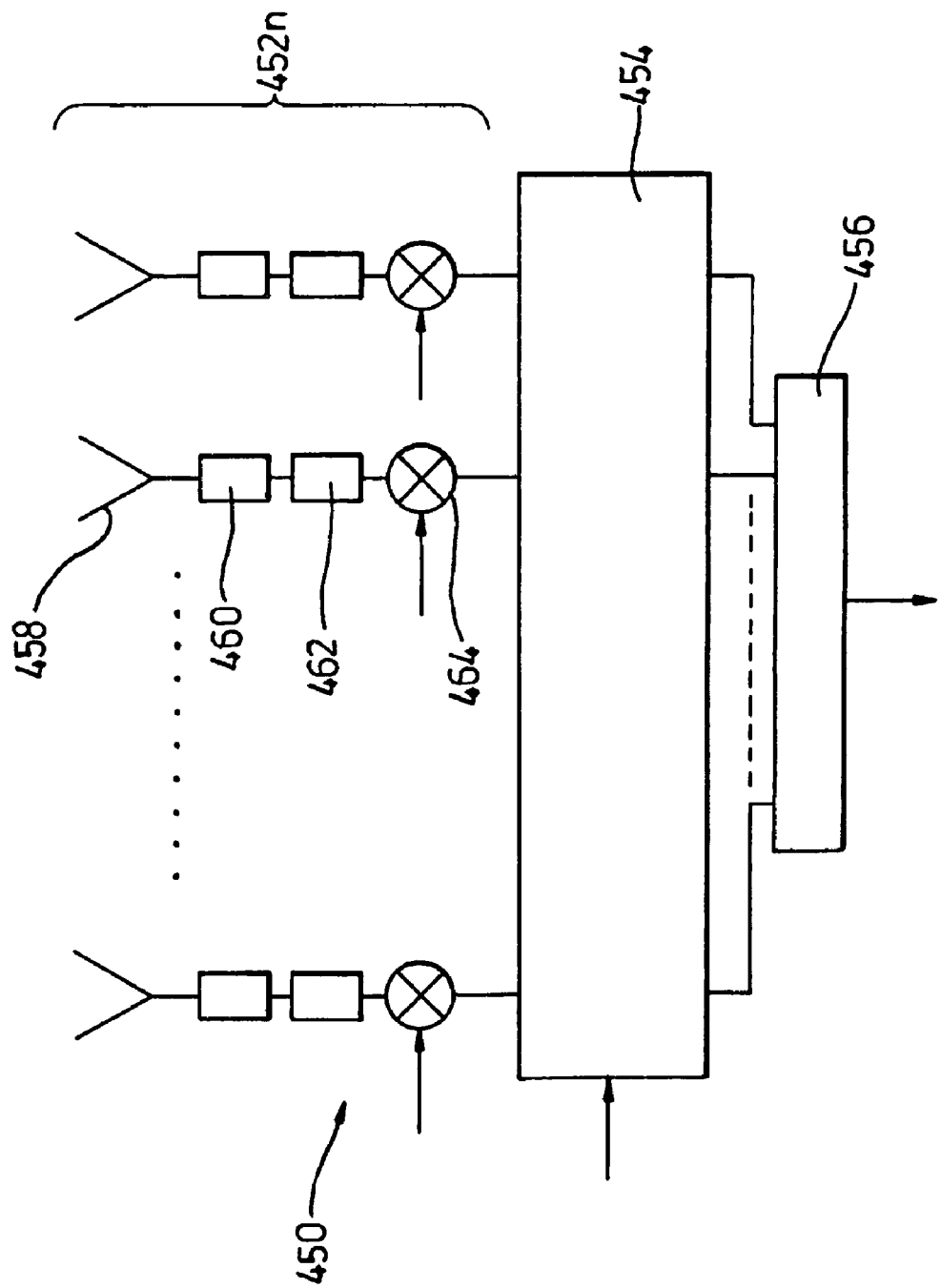
FIG. 4a is a further representation of a prior art hybrid digitally controlled analogue adaptive phased array antenna.

FIG. 4a is a schematic diagram of a low cost phased array antenna 450 comprising a plurality of receiver chains 452a–n, a beamformer and a summation unit 456. Each receiver chain 452a–n comprises a receiving element 458, a low noise amplifier 460, an image reject filter 462 and a frequency downshifitng mixer 464.

Receiver chains 452 pass received signals to a digitally controlled analogue beamformer 454 that operates at a down-shifted intermediate frequency, typically around 1 GHz.

The output of the beamformer 454 is typically at around 50 MHz and is passed to the summation unit 456 from where the beamformed output is passed to external circuitry for further processing/analysis.

Figure 5:
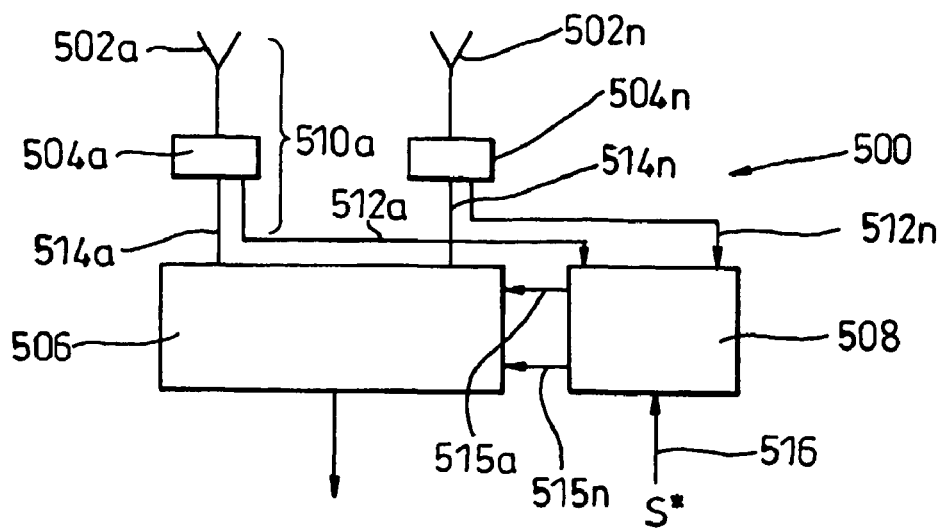
FIG. 5 is a schematic representation of a temporal Nyquist sampling rate fully digital adaptive phased array antenna.

Referring now to FIG. 5, this shows a fully digital implementation of a temporal Nyquist sampling rate adaptive phased array antenna 500 comprising a plurality of receiving elements 502a–n each with an associated high speed analogue to digital converter (ADC) 504a–n, a digital microprocessor 506 and an adaptive processor 508.

Each of the receiving element 502a–n receives a fraction of an incident wavefront (not shown) as this passes down receiver chains 510a–n it is digitised by the high speed ADCs 504*a–n*. A first portion of each of the digitised signals 512*a–n* is split or coupled to the adaptive processor 508 and a second portion 514*a–n* passes to the microprocessor.

An adaptive algorithm acts upon the first portion of the digitised signals 512*a–n* in order to calculate the required weightings 515*a–n* for a desired steering vector 516 that is also input to the adaptive processor 508.

The second portion of the digitised signals 514*a–n* passes to the microprocessor 506. The required weightings 515*a–n* are also passed to the microprocessor 506 where they act upon the second portion of the digitised signals 514*a–n* in order to phase correct them and the microprocessor 506 performs the role of beamformer.

Although shown as separate devices it will be appreciated that the microprocessor 506 and the adaptive processor 508 may be part of the same digital signal processor or indeed may be signal processing algorithms running on the same or different microprocessor(s)/digital signal processor(s).

This arrangement does provide for a complete digital architecture that is capable of beamforming, however the temporal information rate upon an incoming channel is typically tens of MHz. Therefore in order to be capable of sampling the incoming channel in the temporal domain without the possibility of aliasing the ADCs must be capable of satisfying the temporal Nyquist criterion of sampling at twice the rate of the maximum bandwidth of the incoming signal, i.e. 2× tens of MHz. ADCs capable of operating at these sampling rates do exist but are very expensive. They need to sample and hold signals at the very high frequencies, and convert them to digital signals at the very high signal frequencies.

Figure 6:
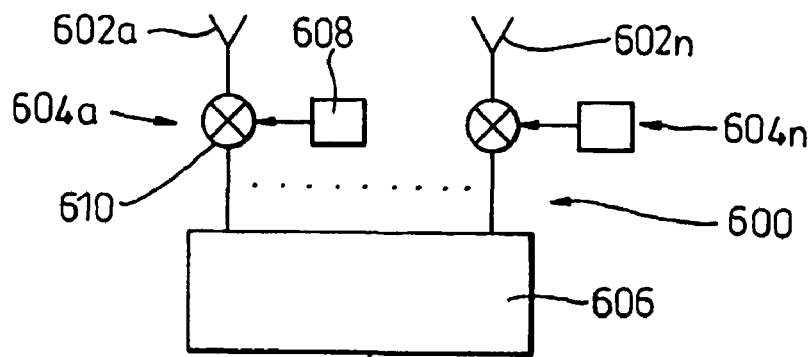
FIG. 6 is a schematic representation of an analogue adaptive phased array antenna.

Referring now to FIG. 6, a temporal Nyquist sampling rate analogue adaptive array antenna 600 comprises a plurality of receiving elements 602*a–n*, a plurality of phase changers 604*a–n* associated with respective receiving elements 602*a–n* and a beamformer 606. Each phase changer 604*a–n* comprises a control unit 608 and a vector modulator 610. The phase changers 604*a–n* are intended to correct the phase of an incoming wavefront.

In all of the aforementioned arrangements standard beamforming techniques such as tapering the output across the array aperture in order to reduce sidelobe ripple and the use of attenuators in order to minimise sidelobe contributions can be employed.

As the prior art discussed hereinbefore show the temporal Nyquist sampling of high frequency, wide bandwidth information channels for adaptive antenna arrays is a non-trivial exercise and can only be accomplished by the use of ultra-fast, high cost digital components and ADCs or by highly complex analogue signal processing and circuitry.

However, sampling in the spatial domain provides an alternative sampling regime that has a lower Nyquist sampling rate constraint than the temporal domain, typically 30–40 kHz cf. 5 MHz temporal bandwidth. This is because rate of the spatial variation in the environment is very much lower than the rate of temporal variation. In order that the adaptive algorithm functions effectively the spatial covariance of the arriving signal environment must be accurately estimated. For a low cost narrowband system this can be assumed to be frequency independent. The temporal signals may be undersampled with no loss of spatial covariance information. i.e. by undersampling at under the Nyquist rate higher frequencies are folded into the sampling bandwidth with their spatial covariance information preserved. (A mathematical treatment of the covariance in both the spatial and temporal domains can be found in Appendix A.)

This reduces the need for ultra-fast digital components and ADCs in order to calculate the complex weighting components required for beamforming. It is still necessary to use ultra-fast digital components or analogue circuitry for the analysis of the temporal information from an information channel. This is clearly the case for a digital analysis, as any such analysis must still fulfil the temporal Nyquist criteria in order to prevent aliasing and loss of temporal information from the signal.

Figure 7:
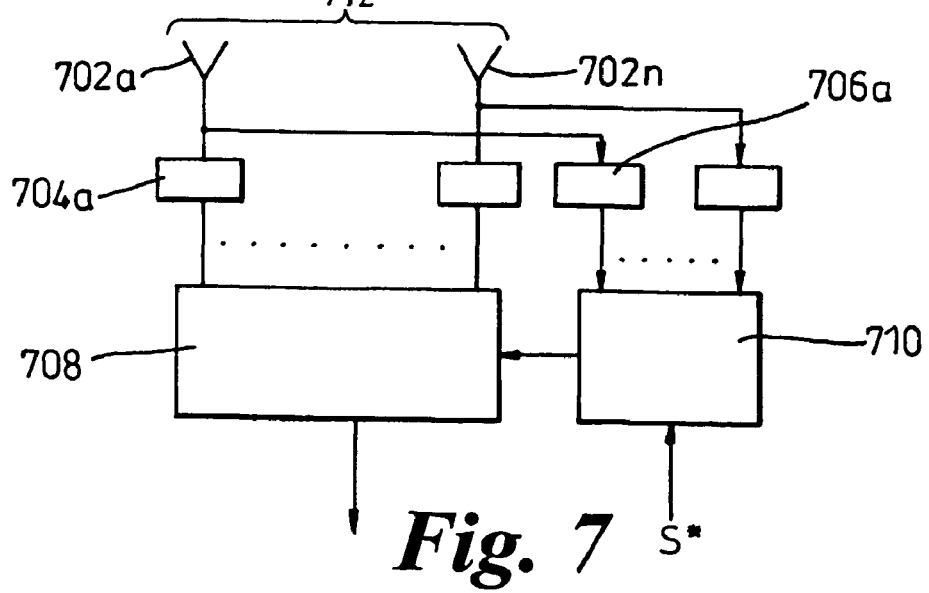
FIG. 7 is a schematic representation of a fully digital undersampling adaptive phased array antenna according to an aspect of the present invention.

Referring to FIG. 7, a digital, temporally undersampled, phased array antenna 700 comprises a plurality of receiving elements 702*a–n*, a plurality of high sampling rate ADCs 704*a–n*, a plurality of low sampling rate ADCs 706*a–n*, a microprocessor 708 and an adaptive processor 710. Any given receiving element 702*a* has a respective high sampling rate ADC 704*a* and a low sampling rate ADC 706*a* associated therewith.

Each receiving element 702*a–n* receives a fraction of a wavefront (not shown) incident upon an array aperture 712 and forming respective received signals 714*a–n*. A first portion 716*a–n* of each of the received signal 714*a–n* is tapped off and fed to the low sampling rate ADCs 706*a–n*. The low sampling rate ADCs 706*a–n* pass the digital signals to the adaptive processor 708 where the complex weighting coefficients are calculated for an input steering vector 718.

A second portion 720*a–n* of each of the received signals 714*a–n* passes directly to the high sampling rate ADCs 704*a–n*. The resultant digital signals are passed to the microprocessor 708 where they are processed along with their respective complex weighting coefficients in order to perform the beamforming operation. This arrangement reduces the computational load upon the high speed microprocessor 708 and allows the calculation of the complex weighting coefficients to be calculated by the adaptive processor 706 which may have reduced computational power compared to the microprocessor 708.

Despite having low sampling rates the ADCs 706*a–n* must have sufficiently low sample-and-hold (S/H) times that the acquisition times to be able to capture the incoming analogue signal. A typical radar input signal will have a frequency of around 10 GHz. This requires a S/H acquisition time of 0.1 ns or less, which is at the upper end of current capabilities. This requirement for very low S/H acquisition time ADCs increases the cost of this arrangement but it is still below that of full temporal Nyquist sampling arrangements because of the reduction in the computational power required, and because the actual conversion from analogue to digital does not need to be performed so fast—only the "snap-shot" capture of the signal. One possible solution would be to add a further mixer stage before digitising. Thus, the ADC input would be a lower IF and thus the S/H specification could be relaxed.

Figure 8:
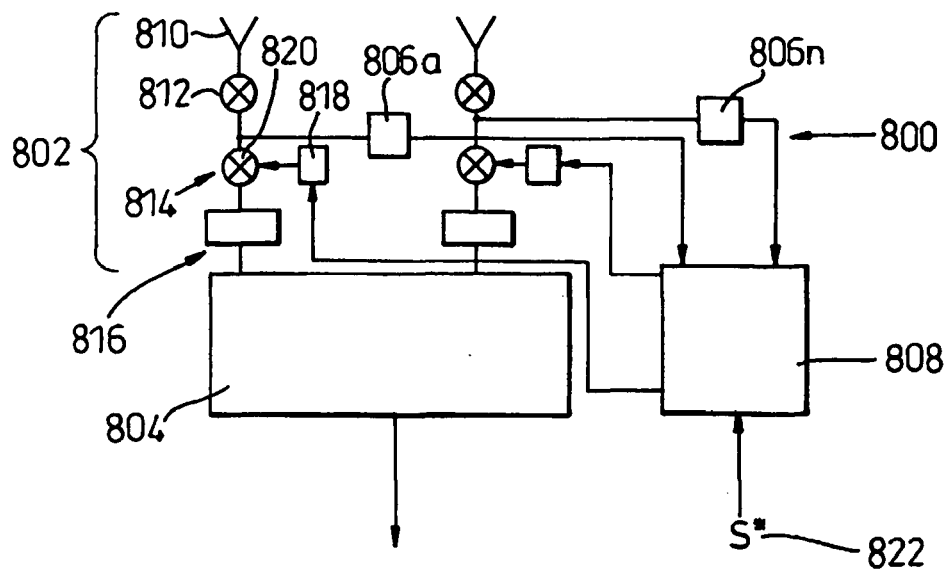
FIG. 8 is a schematic representation of a first embodiment of a digitally sampled and controlled undersampled adaptive phased array antenna according to an aspect of the present invention.

Referring now to FIG. 8, a digitally controlled, temporally undersampled, analogue phase array antenna 800 comprises a plurality of receiver channels 802*a–n*, a beamformer 804, and plurality of low sampling rate ADCs 806*a–n*, and a digital adaptive processor 808.

Each receiver channel 802*a–n* comprises a receiving element 810, a downshifting frequency mixer 812, a phase modulator 814 and an attenuator 816. The phase modulator 814 comprises a digital control unit 818 and a vector modulator 820, typically a phase controlled local oscillator and diode arrangement.

A signal is received at the receiving element 810 and is frequency downshifted by the mixer 812, typically an incoming radar signal with a frequency of 10 GHz is downshifted to 1 GHz at this stage.

A portion of the signal is tapped off after the mixer 812 and before the phase modulator 814. This portion of the signal passes to a respective ADC 806a–n. The digitised signal is then passed to the digital adaptive processor 808 where the complex weighting coefficients for an input steering vector 822 are calculated.

The complex weighting coefficients for each receiver channel 802a–n are passed from the adaptive processor 808 to the digital control unit 818 of the respective phase modulator 814 where they are converted into analogue signals and applied to the vector modulator 820.

The remainder of the incoming signal passes down the receiving chain 802a–n from the mixer 812 to the phase modulator 814 where the complex weighting coefficients are applied thereto.

The phase modulator 814 not only acts to impose the phase of the local oscillator upon the incoming signal, thereby effecting the weighting of the incoming signal, but typically also acts as a downshifting frequency mixer. In a typical arrangement the post mixer 812 1 GHz signal will be mixed down to 140 MHz by mixing it with an 860 MHz signal at the phase modulator 814.

From the phase modulator 814 the signal passes through the attenuator 816 to the beamformer 804 where analogue beamforming takes place in the known manner, by the summation of the weighted contributions from each of the receiving chains 802a–n. The attenuator 816 acts to remove sidelobe contributions from a radiator's output radiation pattern.

Whilst this arrangement still requires short acquisition time, comparatively expensive, SH circuits on the ADCs 806a–n, as a 1 GHz signal may, in some embodiments still be required to be acquired in approximately 0.1 ns, it does have the advantage that the phase modulator 814 has not altered the phase of the incoming sample prior to it's sampling. Therefore there is not the need to computationally remove these complex weightings from the sampled signal before calculating new complex weightings. Also, as the signal has undergone relatively minor analogue signal processing the opportunities for distortion of the signal, with the consequential loss of information content, are minimised.

Figure 9:
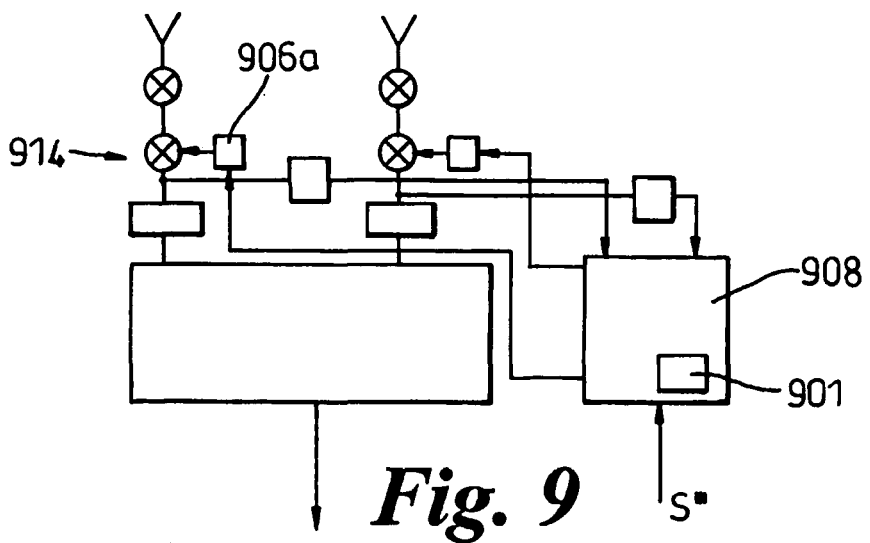
FIG. 9 is a schematic representation of a second embodiment of the undersampled adaptive phased array of FIG. 8.

Referring now to FIG. 9, similar parts to those shown in FIG. 8 are accorded the same reference numeral in the nine hundred series, in this arrangement, which is substantially the same as that of FIG. 8, the incoming signal is sampled between the phase modulator 914 and the attenuator 916.

As noted hereinbefore this does require the adaptive processor 908 to computationally remove the previous complex weighting coefficients from the sampled signal prior to calculating new complex weighting coefficients. However, this can be overcome by storing the previous set of coefficients in a memory unit 901 of the processor 908 and calling them from memory 901 when required in order to recreate the uncorrupted frequency downshifted signal. This arrangement does not require such high specification SH circuits within the ADCs 906a–n as the incoming signal has been further frequency downshifted by the phase modulator 914, typically to about 140 MHz.

Figure 8A:
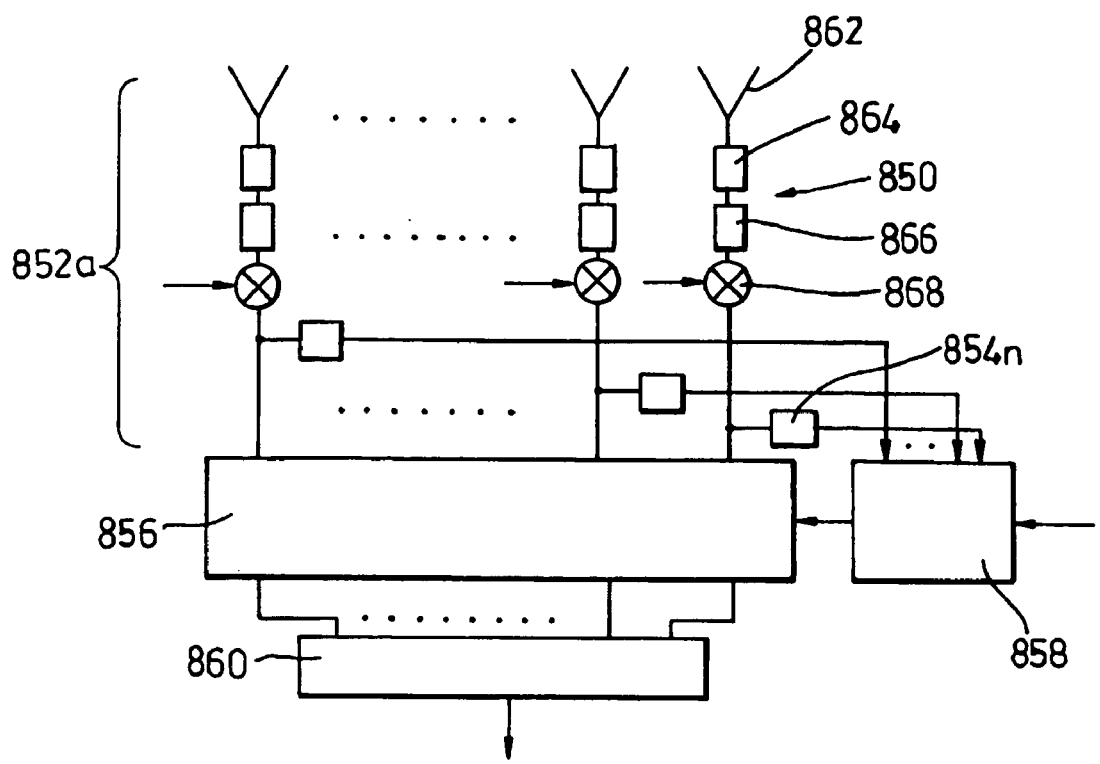
FIG. 8a is a schematic representation of a further arrangement of an undersampled adaptive phased array antenna.
Figure 9A:
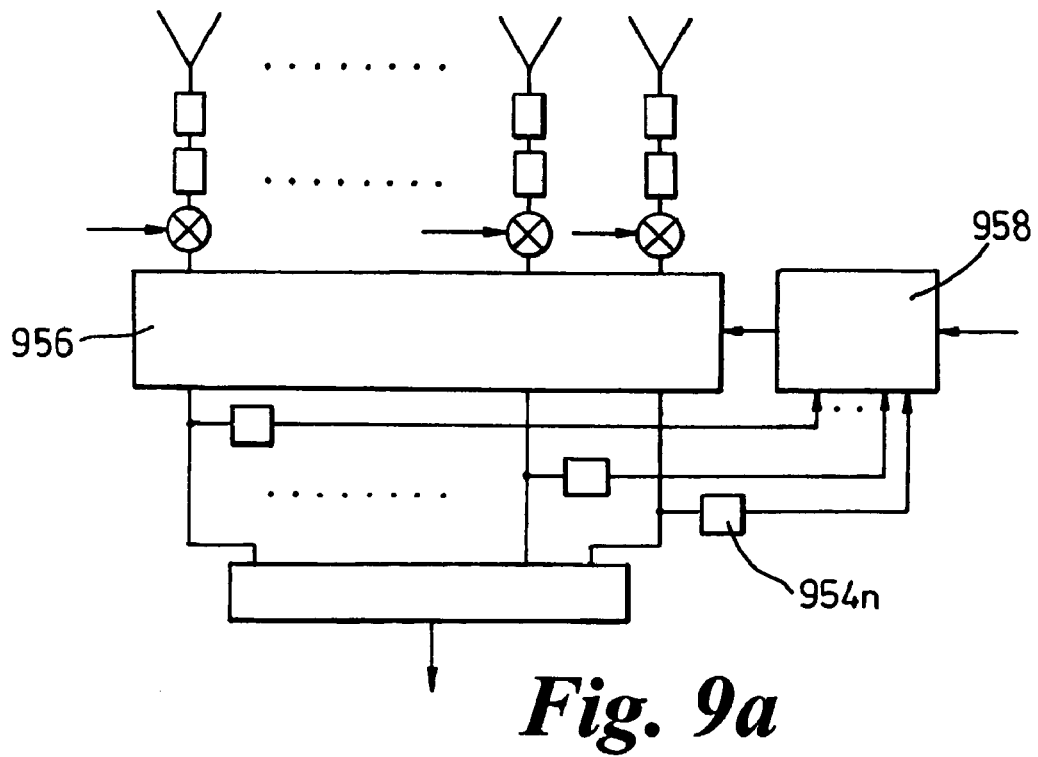
FIG. 9a is a schematic representation of a further arrangement of an undersampled adaptive phased array antenna.

FIGS. 8a and 9a show alternative sampling arrangements for adaptive phased array antennae according to an aspect of the present invention.

Referring now to FIG. 8a, a phased array antenna 850 comprises a plurality of receiving channels 852a–n, a plurality of ADC's 854a–n, an intermediate frequency beamformer 856, a digital adaptive processor 858 and a summation unit 860. Each receiving channel 852a–n comprises a receiving element 862, a low noise amplifier 864, an image reject fitter 866 and a downshifting frequency mixer 868. The beamformer 856 is typically an array of digitally controlled phase modulators. The sampling of an incoming signal, A/D conversion and calculation of the complex weighting coefficients is substantially as described in FIG. 8.

The complex weighting coefficients are passed to the beamformer 856, typically operating at 1 GHz, where the phase corrections are applied to the incoming signals. Typically, the beamformer 856 also downshifts the frequency of the signals further, for example to 50 MHz, prior to the signals passing to the summation unit 860. The summation unit 860 performs the summation of the signals to generate a single beamformed output.

Referring to FIG. 9a, similar parts to those of FIG. 8a will be accorded the same reference numerals in the nine hundred series. In this arrangement, the signals are sampled after they have passed through the intermediate beamformer 956. This necessitates the adaptive processor 958 storing the previously applied complex weighting coefficients in order that they can be subtracted from the sampled signal prior to the calculation of a new set of complex weighting coefficients. Other than the differences noted above the arrangement of FIG. 9a operates substantially as described hereinbefore in relation to the arrangement of FIG. 8a.

Figure 10:
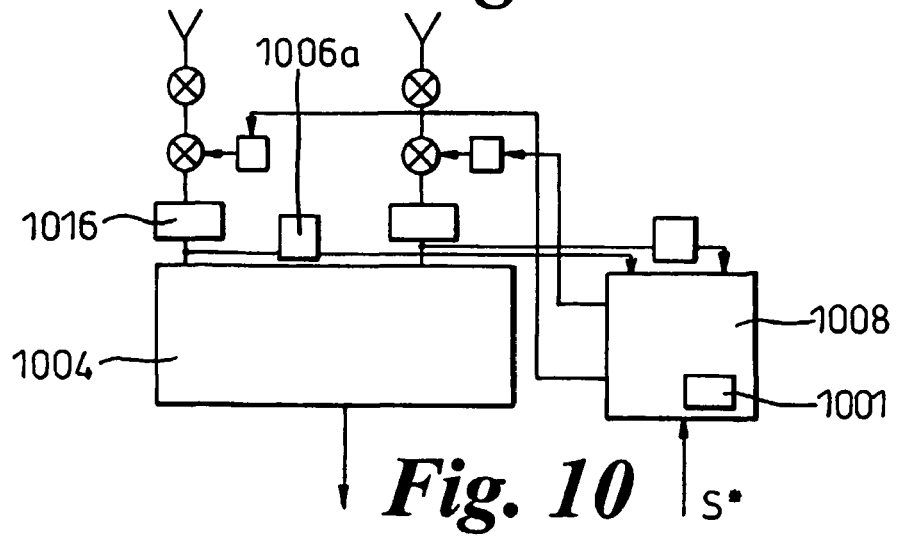
FIG. 10 is a third embodiment of the undersampled adaptive phased array antenna of FIG. 8.

Referring now to FIG. 10, similar parts to those shown in FIG. 8 are accorded the same reference numeral in the one thousand series, in this arrangement, which is substantially the same as that of FIG. 8, the incoming signal is sampled between the attenuator 1016 and the beamformer 1004.

This arrangement requires the previous complex weighting coefficients to be removed computationally using adaptive processor 1008 that stores the previous complex weighting coefficients in memory unit 1001 prior to the calculation of a new set of complex weighting coefficients, as described in relation to the arrangement of FIG. 9.

Further to which this arrangement will exhibit a lower signal-to-noise ratio than the arrangements of FIGS. 9 and 10 due to having passed through the attenuator and may therefore suffer from some loss of information within the signal. However, in applications where suppression of sidelobe contributions are important this arrangement will have significant benefits.

This arrangement will be able to operate with the longer SH acquisition time ADCs 1006a–n.

Thus, the embodiments of the invention of FIGS. 7, 8, 9 and 10 all have their own distinct merits relative to one another.

Figure 11:
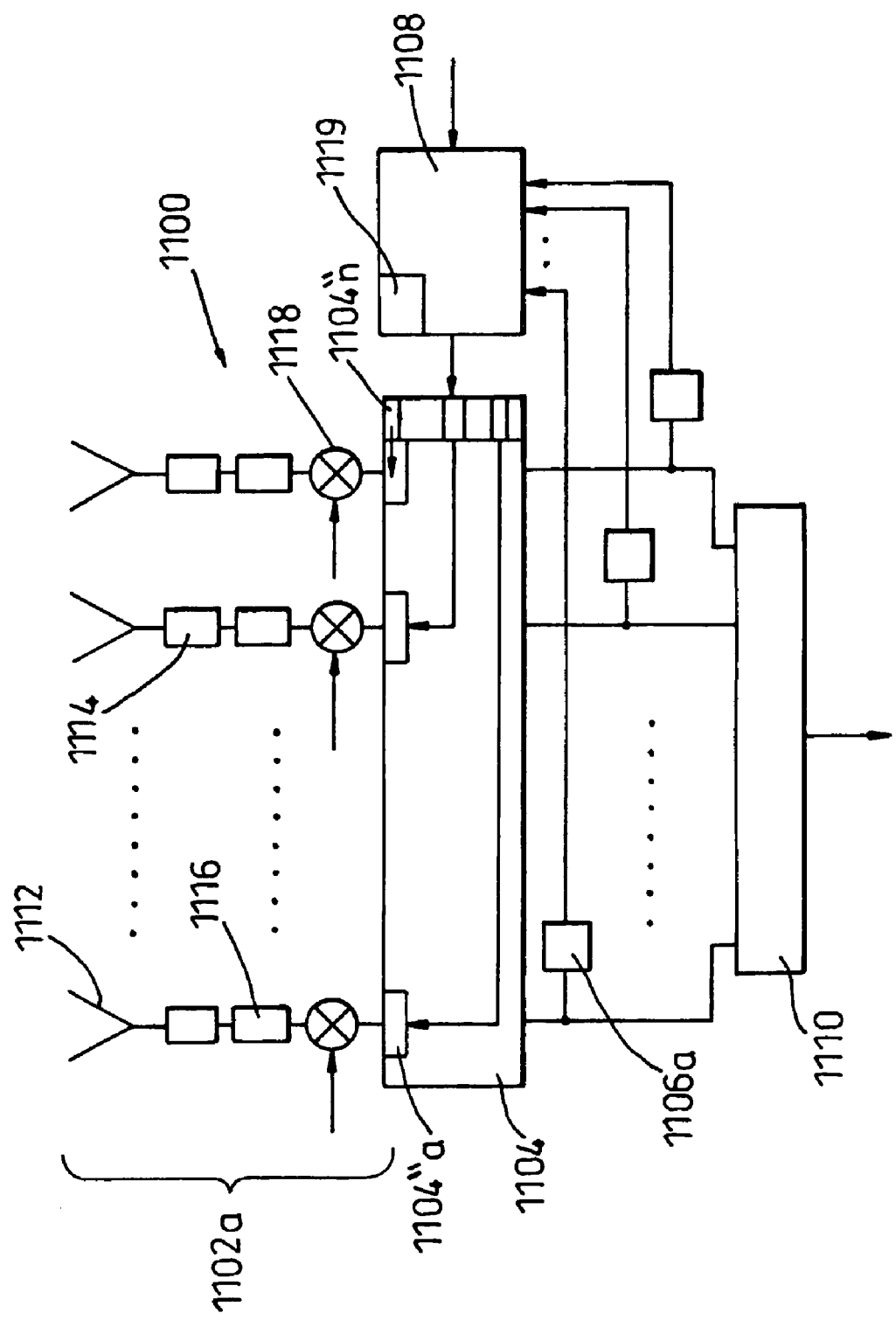
FIG. 11 is a schematic representation of a yet further embodiment of a phased array antenna according to at least one aspect of the present invention.

Referring now to FIG. 11, a phased array antenna 1100 comprises a plurality of receiving chains 1102a–n, a plurality of ADC's 1106a–n, an intermediate frequency beamformer 1104, a digital adaptive processor 1108 and a summation unit 1110. Each receiving chain 1102a–n comprises a receiving element 1112, a low noise amplifier 1114, an image reject fitter 1116 and a downshifting frequency mixer 1118. The beamformer 1106 is typically an array of phase modulators 1104'a–n that are controlled by respective digital control units 1104"a–n. The adaptive processor 1109 includes a memory unit 1119 that stores previously calculated complex weighting coefficients.

Each receiving element 1112a–n receives a portion of a wavefront (not shown). An analogue signal corresponding to a respective portion of the wavefront passes from the receiving elements 1112a–n to the intermediate frequency beamformer 1104 via respective amplifiers 1114, filters 1116 and mixers 1118.

The beamformer 1104 applies complex weighting coefficients calculated by the process or 1108 to each of the incoming signals, typically in response to a steering vector input into the processor 1108, in order to steer an output beam for a response pattern of a receiving array. The beamformer 1104 usually operates at about 1 GHz. Typically the beamformer 1104 downshifts the signals frequency to about 50 MHz prior to outputting the signals to the summation unit 1110.

Each of the signals exits the beamformer 1104 by respective output channels. Each signal is sampled after leaving the beamformer 1104 but before entering the summation unit 1110, typically either by a coupling arrangement, as shown in FIG. 3a, or by tapping a portion of each of the signals. The samples of the analogue signals pass to respective ADCs 1106a–n where they are digitised.

The digitised signal samples pass to the adaptive processor 1108. The processor 1108 accesses the previously calculated weighting coefficients from the memory unit and uses them to modify the sampled signals such that the sampled signals correspond to the received signal before beamforming, typically by, for example by the multiplication of each signal by the reciprocal of the complex weight directly. Alternatively, the complex weighting due to the weighting circuitry can be removed either by the multiplication of each element of the estimated complex spatial covariance matrix of the incoming signals by the reciprocal of the appropriate two complex weightings multiplied together, or by pre and post-multiplication of the estimated complex spatial covariance matrix of the incoming signals by diagonal matrices of the appropriate complex reciprocal weightings.

The processor 1108 calculates a new set of complex weighting coefficients based upon the incoming wavefront and an input steering vector 1120. The newly calculated weighting coefficients replace the previously calculated weighting coefficients in the memory unit 1119.

Digital signals including the complex weighting coefficients are sent by the processor 1108 to respective digital control units 1104"a–n of the beamformer 1104. These digital signals are converted to analogue signals to control respective phase modulations 1104'a–n in order to carry out beamforming upon incoming signals.

Figure 12:
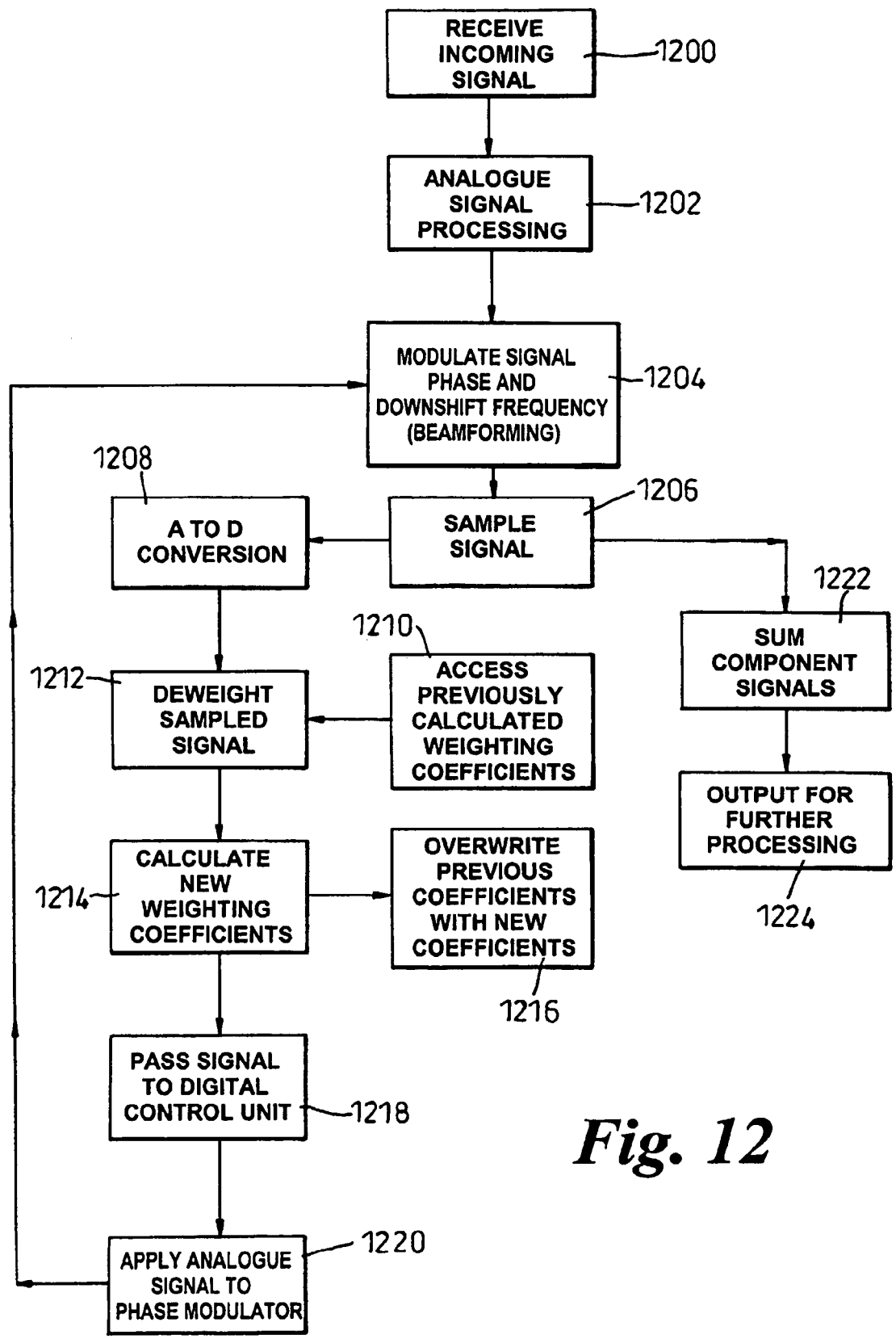
FIG. 12 is a flowchart detailing a method of signal processing according to an aspect of the present invention.

Referring now to FIG. 12, this is a flowchart detailing a method of adaptive signal processing according to an aspect of the present invention.

An adaptive antenna array receiving element receives an incoming signal (step 1200). The incoming signal will typically undergo initial analogue processing (step 1202), for example frequency mixing, typically from around 2 GHz (for a wireless LAN) or >60 GHz (for short range radar) to around 1 GHz, phase modulation and/or attenuation.

The signal is beamformed using an analogue beamformer that typically consists of a digitally controlled analogue amplitude and phase modulator. The phase modulator modulates the phase of the signal by imposing the phase of a local oscillator upon the signal and steps the signal frequency down (step 1204), typically to around 50 MHz. The phase of the local oscillator is set by the digital control unit described hereinafter.

The beamformed signal is sampled, usually either by coupling or tapping off a portion of the sample (step 1206). The sampled signal undergoes analogue to digital conversion (step 1208). The digitised signal is processed by the processor. This processing involves the processor accessing previously a calculated complex weighting coefficient (step 1210) for each input signal, and deweighting the digitised signal using the previously calculated coefficient (step 1212), for example by the multiplication of each signal by the reciprocal of the complex weight directly. Alternatively, the complex weighting due to the weighting circuitry can be removed either by the multiplication of each element of the complex covariance matrix by the reciprocal of the appropriate two complex weightings multiplied together, or by pre and post-multiplication of the covariance matrix by diagonal matrices of the appropriate complex reciprocal weightings.

The deweighted signals are used to calculate a new complex weighting coefficient for each input channel (step 1214), typically in conjunction with an input steering vector.

The new coefficients replace the previously calculated coefficients in the adaptive processors memory (step 1216).

The now complex weighting coefficient is passed to the digital control unit of the input channel where it is converted into an appropriate analogue signal (step 1218) to be applied to the phase modulator (step 1220) in order to carry out the beamforming operation (step 1204).

The analogue signal from the output of the beamformer passes to a summation unit where it is summed (step 1222) and output for further processing (step 1224).

Figure 13:
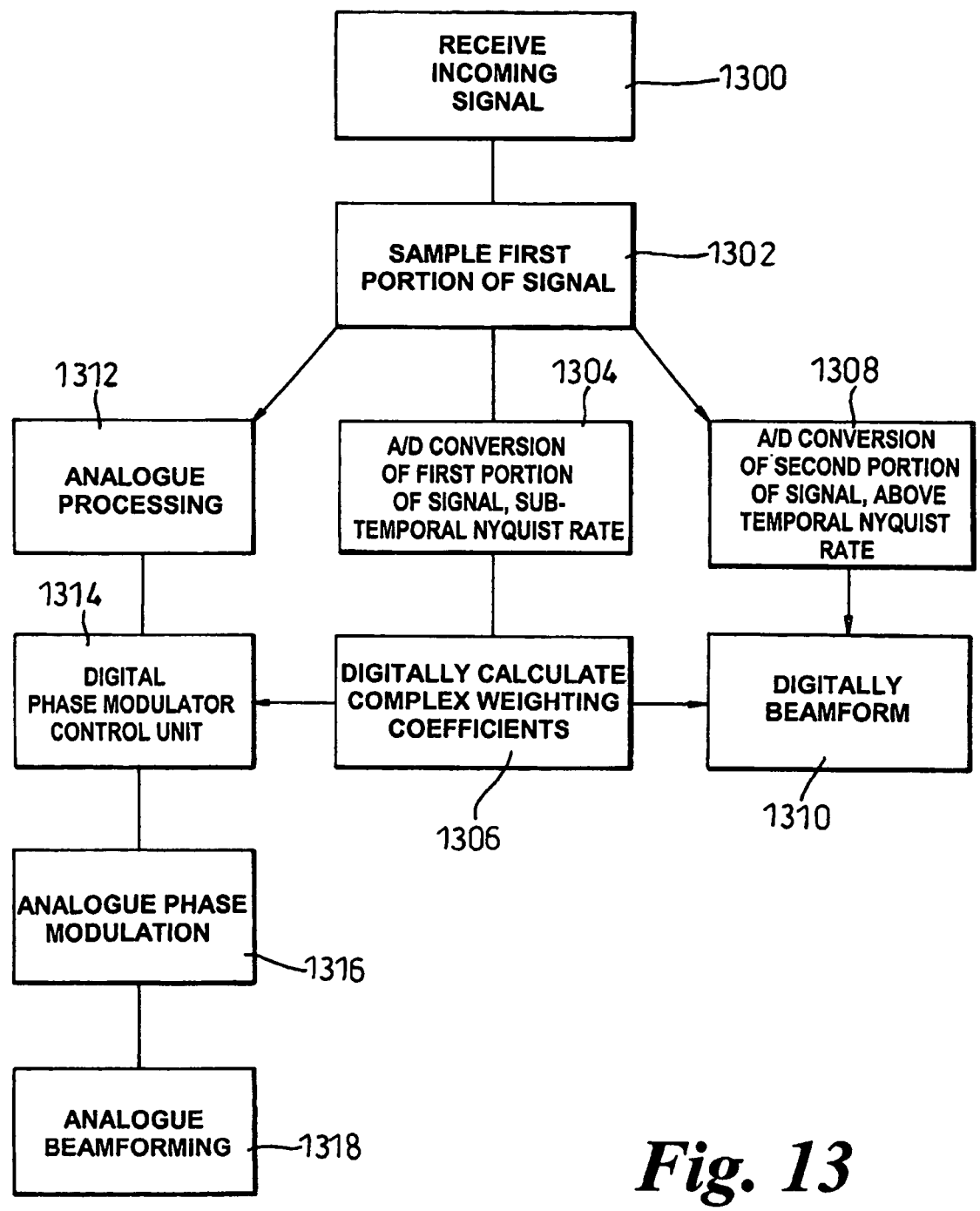
FIG. 13 is a flowchart detailing a method of signal processing according to another aspect of the present invention.

Referring now to FIG. 13, this is a flowchart detailing a method of adaptive signal processing according to an aspect of the present invention.

An adaptive antenna array receives an incoming signal (step 1300). The incoming signal may or may not undergo an initial analogue processing step, for example mixing, phase modulation and/or attenuation. A sample portion (first portion) of the signal is tapped off from the main body (second portion) of the signal (Step 1302) and is subject to analogue to digital conversion at a sub-temporal Nyquist sampling rate (step 1304). The digital first portion of the signal is used to digitally calculate the complex weighting coefficients required to perform beamforming (Step 1306). This calculation may include a correction for any previously applied complex weighting coefficients present within the sampled first portion of the signal.

If a fully digital approach is being applied to the adaptive beamforming the main body of the signal is subject to analogue to digital conversion at a rate above the temporal Nyquist rate of the incoming signal (step 1308), in order to preserve temporally sensitive information within the signal. A digital processor then carries out a beamforming routine using the digitally calculated complex weighting coefficients and the digitised main body of the signal (step 1310).

Should a hybrid analogue-digital approach be taken to the adaptive beamforming operation the main body of the signal will typically be subject to analogue signal processing (step 1312). The digitally calculated complex weighting coefficients are passed to a digital control unit for an analogue phase modulator (step 1314). The analogue phase modulator modulates the phase of the main body of the incoming signal, typically by imposing the phase of a local oscillator upon the incoming signal (Step 1316). The phase of the local oscillator having been set by the digital control unit based upon the digitised complex weighting coefficients. The main body of the incoming signal then pass to an analogue beamformer for summation in the usual fashion (Step 1318).

The major advantages of the signal processing systems and methods according to the present invention are the removal of the necessity to have high speed ADC's which are costly with the consequential decrease in the processing power required to calculate the complex weighting coefficients to be applied to form a beam. This increases the utility of adaptive beamformers opening up further fields of usage including the spatial filtering by directional nulling in mobile telecommunication networks, or wireless LANS, for example IEEE802.11, HiperLan or Bluetooth, to allow the selective rejection of users from a channel at a given point in time thereby increasing the number of users that can be handled in any one information channel.

It will be appreciated that although only referring to the reception of radiation due to the reversible traceability of radiation any one, or combination, of the methods, or systems, described hereinbefore may be applied in a transmission mode as well as in reception mode.

Appendix A

It can be shown that the optimum solution for a weighting vector is given by:

$$w_{opt}=R^{-1}C(C^H R^{-1}C)^{-1}f \quad (1)$$

where C is the matrix of constraint vectors, f is a vector of gain constraints and R is the matrix of cross-correlations between signals arriving at the array aperture.

The primary limiting factor on the satisfactory performance of this type of adaptive algorithm is the successful calculation of the covariance matrix R, since this is unknown and must be estimated from the received signals.

The temporal signals may be undersampled with no loss of spatial covariance information. i.e. by undersampling at under the Nyquist rate higher frequencies are folded into the sampling bandwidth with their spatial covariance information preserved.

A further constraint on the sampling rate is the rate at which the signal environment changes. If the sampling rate is low then the up-date rate of the covariance matrix will be slow. Hence the covariance estimate will be inaccurate for a signal environment which is moving quickly and the adaptive algorithm's performance degraded. For many array applications, however, the scenario changes relatively slowly.

If the signal vector entering the complex weighting circuitry (vector modulator and digital attenuator) is given by the vector:

$$x=(X_0 x_1 \ldots x_n)^T \quad (2)$$

then the calculated covariance matrix is given by:

$$R=E[xx^H] \quad (3)$$

Where E[ ] is the expectation operator. In expanded format:

$$R = \begin{bmatrix} \overline{x_0 x_o^*} & \overline{x_0 x_1^*} & \cdots & \overline{x_0 x_N^*} \\ \overline{x_1 x_o^*} & \overline{x_1 x_1^*} & \cdots & \overline{x_{1N} x_N^*} \\ \vdots & \ddots & \ddots & \vdots \\ \vdots & & \cdots & \overline{x_N x_N^*} \end{bmatrix} \quad (4)$$

where * is the complex conjugate.

If the weighted signal vector is given by:

$$x_w = (w_0^* x_0 w_1^* x_1 \ldots w_N^* x_N)^T \quad (5)$$

then the covariance matrix, Rh, calculated from the pre-weighted signal vector is given by:

$$R = \begin{bmatrix} w_0^* w_0 \overline{x_0 x_0^*} & w_0^* w_1 \overline{x_0 x_1^*} & \cdots & w_0^* w_N \overline{x_0 x_N^*} \\ w_1^* w_0 \overline{x_1 x_0^*} & w_1^* w_1 \overline{x_1 x_1^*} & \cdots & w_1^* w_N \overline{x_{1N} x_N^*} \\ \vdots & \ddots & \ddots & \vdots \\ \vdots & & \cdots & w_N^* w_N \overline{x_N x_N^*} \end{bmatrix} \quad (6)$$

This is a weighted version of the desired covariance matrix R. Since the array weights are known, an estimate of the covariance matrix can be deduced from equation (6).

An adaptive weight calculation algorithm is discussed here in more detail. The simplest solution to the power minimisation problem is given by equation (1), repeated here for a single look direction unity gain constraint:

$$w = R^{-1} s (s^H R^{-1} s)^{-1} \quad (7)$$

where s is a single look direction constraint, and R is the covariance matrix.

The conventional power minimisation adaptive algorithm attempts to reduce the total power in the beamformed output. Let us consider the case where no attempt is made to remove the clutter from the adaptive processing signal path.

The covariance matrix may be therefore be written as the sum of three components:

$$R = M + V + Q \quad (8)$$

where M is the covariance of the interference, V is the covariance of the clutter and Q is the thermal noise covariance. Each is assumed mutually uncorrelated.

The adaptive weight vector solution of equation (7) would attempt to minimise the total power entering the array.

the coupling corrected low sidelobe weight vector is defined as wq. If the adapted beam pattern is described by a weight.vector w, then the total error power entering the beamformed output, i.e. the difference between the desired power and actual power, is given by:

$$e = k^2 (w - w_q)^H \left[ \int_{-\frac{\pi}{2}}^{\frac{\pi}{2}} h(\theta) g(\theta) s(\theta) s^H(\theta) d\theta \right] (w - wq) \quad (10)$$

where $k^2 h(\theta)$ is a weighting function which can be chosen to emphasise particular parts of the array pattern, $g(\theta)$ is the vector of element pattern gains for angle $\theta$ and $s(\theta)$ is the steer vector for angle $\theta$.

Since the term in square brackets is the weighted cross-correlation of signals entering. each element of the array, from all look angles, it is an N×N matrix, where N is the number of elements. This matrix is denoted as Z. It is identical to the space covariance of the clutter covariance V except for the weighting factor $k^2 h(\theta)$ which acts to emphasise the sidelobe region in preference to the main beam region. Thus, by a judicious choice of k and $h(\theta)$ an error power can be calculated that is dominated by the sidelobe rather than main beam clutter error power. Finding a weight vector that minimises this error power will reduce the gain in the sidelobe regions.

A suitable cost function to be minimised is the total power plus error power, given by:

$$w^H + k^2 (w - w_q)^H Z (w - w_q) + \lambda Z (c^H w - 1)^* (c^H w - 1) \quad (11)$$

where a look direction constraint of the form cHw=1 has been imposed in the usual way. The second term in this equation is the error power covariance whose dominance is under the control of parameter k. The solution to this minimisation problem is given by:

$$w_{opt} = [R+k^2Z+\lambda^2cc^H]^{-1}[k^2Zw_q+\lambda^2c] \quad (12)$$

Putting $A=R+k2Z$ and $A_{:-\infty}$, it can be show that the solution to (12) under these conditions is:

$$W_{opt} = \frac{A^{-1}c}{c^HA^{-1}c} + k^2A^{-1}Zw_q - \frac{k^2A^{-1}cc^HA^{-1}Zw_q}{c^HA^{-1}c} \quad (13)$$

Thus, this weight vector will produce a beam which is arbitrarily close to the quiescent weight vector wq, under the control of k, whilst satisfying the look direction constraint and minimising the interference power.

In the limit, as k–0, the solution reduces to the form:

$$W_{opt} = \frac{'R^{-1}c}{c^HR^{-1}c} \quad (14)$$

which is the well known solution for an array with a single constraint explored in the previous section.

The invention claimed is:

1. An adaptive signal processing system comprising a plurality of receiving elements, a plurality of analogue to digital converters (ADC's) and digital signal processing means; each of the receiving elements having a respective one of the ADC's connected thereto and being arranged to receive a respective incoming signal, wherein each ADC is arranged to convert a first portion of the respective incoming signals into a digital form at a sampling rate that is less than the temporal Nyquist rate of the incoming signal, and the signal processing means is arranged to calculate complex weighting co-efficients to be applied to respective second portions of the respective incoming signals.

2. A system according to claim 1 wherein the system includes a second plurality of ADC's that are arranged to sample the second portion of the respective incoming signals at at least the temporal Nyquist sampling rate.

3. A system according to claim 2 wherein the first plurality of ADO's are arranged to sample the incoming signals prior to them reaching the second plurality of ADC's.

4. A system according to claim 1 wherein the system includes at least one plurality of phase changing means each of which is connected to a digital control unit, each phase changing means being associated with a respective receiving element.

5. A system according to claim 4 wherein each control unit is arranged to supply a digital or an analogue signal to a respective phase changing means such that the second portion of each respective incoming signal has its phase and/or amplitude varied by an amount corresponding to the complex weighting coefficient.

6. A system according to claim 4 wherein the first plurality of ADC's are arranged to sample respective signals after they have been passed through the phase changing means.

7. A system according to claim 6 wherein the processing means may be arranged to remove the phase and/or amplitude variations imposed upon the first portions of the respective signals by the phase changing means.

8. A system according to claim 1 wherein the processing means are arranged to apply the complex weighting co-efficients to the second portion of the incoming signal.

9. An adaptive signal processing system comprising a plurality of receiving elements, signal weighting means, a plurality of analogue to digital converters (ADC's), digital processing means, and in which the signal weighting means have a plurality of input channels and a respective plurality of output channels, the signal processing means including a memory unit arranged to temporarily store a plurality of previously calculated complex weighting coefficients, each of the receiving elements being arrranged to receive an incoming signal and being connected to a respective input channel, each of the ADC's being arranged to sample an analogue signal directly from an output channel, and convert it into digital signals wherein the processing means is arranged to calculate new complex weighting coefficients using the digitised signals and the previously calculated coefficients.

10. A system according to claim 9 wherein the processing means is arranged to transfer the new coefficients to the signal weighting means and the signal weighting means is arranged to apply the new coefficients to an incoming signal.

11. A system according to claim 9 wherein the memory unit is arranged to temporarily store the new complex weighting coefficients by overwriting the previously calculated complex weighting coefficients.

12. A system according to claim 9 wherein the signal weighting means includes a plurality of digital control units and/or respective analogue amplitude and phase modulators.

13. A system according to claim 12 wherein the digital control units are arranged to receive respective new weighting coefficients from the processing means and are arranged to control respective phase modulators so as to beamform the incoming signals, in response to the new weighting coefficients, in use.

14. A method of producing weighting coefficients for adaptive beamforming comprising undersampling analogue signals from antenna elements in comparison with a temporal Nyquist rate; converting the undersampled analogue signals to digital signals in order to produce the weighting coefficients.

15. The method of claim 14 including receiving signals containing temporal information at a control processor at a first frequency and receiving signals relating to the weighting coefficients at the control processor at a second frequency, the first frequency being significantly higher than the second frequency.

16. The method of claim 14 including generating the weighting coefficients using digitally undersampled signals in order to control analogue combination means to combine temporal signals with weighting coefficients.

17. A method of adaptive signal processing comprising the steps of:
 (i) receiving an analogue signal;
 (ii) downshifting the frequency of the signal;
 (iii) beamforming the signal;
 (iv) sampling the signal after beamforming;
 (v) converting the signal sample into a digital signal; and
 (vi) calculating a new complex weighting coefficient using the digitised signal; using the digital signal and the previously calculated complex weighting coefficients digitally.

18. The method of claim 17 including controlling step (ii) using the previously calculated complex weighting coefficient.

19. The method of claim 17 including receiving a plurality of signals and executing steps (ii) to (v) for each respective signal.

20. The method of claim 19 including executing steps (ii) to (v) in parallel for the plurality of signals.

21. The method of claim 17 including generating an analogue output from a digital control unit so as to control a phase modulator to execute step (ii).

22. The method of claims 17 including accessing the previously calculated complex weighting coefficient from a memory unit in order to perform step (v).

23. The method of claims 17 including storing the new complex weighting coefficient in the memory unit, overwriting the previously calculated coefficient with the new coefficients.

24. The method of claim 17 including processing the analogue signal prior to beamforming.

25. The method of claim 24 wherein the processing includes any one, or combination of the following downshifting frequency mixing, attenuation and/or phase modulation.

* * * * *